(12) United States Patent
Håkansson et al.

(10) Patent No.: US 11,781,577 B2
(45) Date of Patent: *Oct. 10, 2023

(54) MECHANICAL LOCKING SYSTEM FOR BUILDING PANELS

(71) Applicant: Välinge Innovation AB, Viken (SE)

(72) Inventors: Niclas Håkansson, Viken (SE); Darko Pervan, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,911

(22) Filed: Jul. 21, 2022

(65) Prior Publication Data
US 2023/0080262 A1 Mar. 16, 2023

Related U.S. Application Data

(63) Continuation of application No. 16/951,394, filed on Nov. 18, 2019, now Pat. No. 11,428,253, which is a
(Continued)

(51) Int. Cl.
*F16B 5/12* (2006.01)
*F16B 12/16* (2006.01)
(Continued)

(52) U.S. Cl.
CPC ........ *F16B 12/125* (2013.01); *A47B 47/0066* (2013.01); *A47B 47/0075* (2013.01);
(Continued)

(58) Field of Classification Search
CPC ... A47B 55/00; A47B 96/066; A47B 47/0066; A47B 47/0075; A47B 47/042;
(Continued)

(56) References Cited

U.S. PATENT DOCUMENTS

| 87,853 A | 3/1869 | Kappes |
| 108,068 A | 10/1870 | Utley |

(Continued)

FOREIGN PATENT DOCUMENTS

| AT | 400611 B | 2/1996 |
| CA | 2456513 A1 | 2/2003 |

(Continued)

OTHER PUBLICATIONS

U.S. Appl. No. 16/953,608, Peter Derelöv, Hans Brännström and Agne Pålsson, filed Nov. 20, 2020 (Cited herein as US Patent Application Publication No. 2021/0285480 A1 of Sep. 16, 2021).
(Continued)

*Primary Examiner* — Ryan D Kwiecinski
(74) *Attorney, Agent, or Firm* — Boone IP Law

(57) ABSTRACT

Panels are shown which are provided with a mechanical locking system allowing perpendicular connection with a snap action. A set of panels including a first and a second panel, an edge of the second panel is insertable into a groove of the first panel, when the panels are arranged essential perpendicular to each other, to obtain a mechanical connection between the first and the second panel, when the second panel is displaced essentially perpendicularly to the first panel.

19 Claims, 11 Drawing Sheets

Related U.S. Application Data continuation of application No. 16/228,975, filed on Dec. 21, 2018, now Pat. No. 10,871,179, which is a continuation of application No. 15/379,791, filed on Dec. 15, 2016, now Pat. No. 10,202,996, which is a continuation of application No. 14/515,988, filed on Oct. 16, 2014, now Pat. No. 9,538,842, which is a continuation of application No. 13/464,512, filed on May 4, 2012, now Pat. No. 8,887,468.

(60) Provisional application No. 61/483,444, filed on May 6, 2011.

(51) Int. Cl.
| | | |
|---|---|---|
| *A47B 47/00* | (2006.01) | |
| *F16B 12/12* | (2006.01) | |
| *F16B 12/26* | (2006.01) | |
| *F16B 5/00* | (2006.01) | |
| *A47B 47/04* | (2006.01) | |

(52) U.S. Cl.
CPC .......... *A47B 47/042* (2013.01); *F16B 5/0056* (2013.01); *F16B 12/26* (2013.01); *E04F 2201/0146* (2013.01); *E04F 2201/0523* (2013.01); *E04F 2201/0535* (2013.01); *Y10T 403/73* (2015.01)

(58) Field of Classification Search
CPC ...... E04F 2201/0523; E04F 2201/0535; E04F 2201/0138; E04F 2201/0146; F16B 12/24; F16B 12/26; F16B 5/0056; F16B 5/0614; F16B 12/125; Y10T 403/73; Y10T 403/7096
See application file for complete search history.

(56) References Cited

U.S. PATENT DOCUMENTS

| | | | |
|---|---|---|---|
| 124,228 A | 3/1872 | Stuart | |
| 213,740 A | 4/1879 | Conner | |
| 274,354 A | 3/1883 | McCarthy | |
| 291,032 A | 1/1884 | Cleland | |
| 316,176 A | 4/1885 | Ransom | |
| 634,581 A * | 10/1899 | Miller | F16B 21/18 403/327 |
| 701,000 A | 5/1902 | Ahrens | |
| 861,911 A * | 7/1907 | Stewart | A47B 47/03 312/263 |
| 881,673 A | 3/1908 | Ellison | |
| 1,194,636 A | 8/1916 | Joy | |
| 1,533,099 A | 4/1925 | Carroll | |
| 1,534,468 A | 4/1925 | Shea, Jr. | |
| 1,723,306 A | 8/1929 | Sipe | |
| 1,743,492 A | 1/1930 | Sipe | |
| 1,800,386 A | 4/1931 | Hoffman | |
| 1,800,387 A | 4/1931 | Greist | |
| 1,802,245 A | 4/1931 | Foretich | |
| 1,809,393 A | 6/1931 | Rockwell | |
| 1,902,716 A | 3/1933 | Newton | |
| 1,954,242 A | 4/1934 | Heppenstall | |
| 2,026,511 A | 12/1935 | Freeman | |
| 2,204,675 A | 6/1940 | Grunert | |
| 2,277,758 A | 3/1942 | Hawkins | |
| 2,360,451 A | 10/1944 | Stone | |
| 2,362,904 A | 11/1944 | Kramer | |
| 2,430,200 A | 11/1947 | Wilson | |
| 2,496,184 A | 1/1950 | Von Canon | |
| 2,497,837 A | 2/1950 | Nelson | |
| 2,596,280 A | 5/1952 | Nystrom | |
| 2,681,483 A | 6/1954 | Morawetz | |
| 2,732,706 A | 1/1956 | Friedman | |
| 2,740,167 A | 4/1956 | Rowley | |
| 2,863,185 A | 12/1958 | Riedi | |
| 2,865,058 A | 12/1958 | Ake et al. | |
| 2,872,712 A | 2/1959 | Brown et al. | |
| 2,889,016 A | 6/1959 | Warren | |
| 3,002,630 A | 10/1961 | Heisser | |
| 3,023,681 A | 3/1962 | Worson | |
| 3,077,703 A | 2/1963 | Bergstrom | |
| 3,099,110 A | 7/1963 | Spaight | |
| 3,147,522 A | 9/1964 | Schumm | |
| 3,195,968 A | 7/1965 | Freeman | |
| 3,271,787 A | 9/1966 | Clary | |
| 3,284,152 A * | 11/1966 | Schorghuber | A47B 47/0041 312/257.1 |
| 3,313,054 A | 4/1967 | Madey | |
| 3,325,585 A | 6/1967 | Brenneman | |
| 3,347,610 A | 10/1967 | Pilliod | |
| 3,378,958 A | 4/1968 | Parks et al. | |
| 3,396,640 A | 8/1968 | Fujihara | |
| 3,410,441 A | 11/1968 | Rhyne | |
| 3,512,324 A | 5/1970 | Reed | |
| 3,517,927 A | 6/1970 | Kennel | |
| 3,526,071 A | 9/1970 | Watanabe | |
| 3,535,844 A | 10/1970 | Glaros | |
| 3,572,224 A | 3/1971 | Perry | |
| 3,579,941 A | 5/1971 | Tibbals | |
| 3,720,027 A | 3/1973 | Christensen | |
| 3,722,379 A | 3/1973 | Koester | |
| 3,722,704 A | 3/1973 | Piretti | |
| 3,722,971 A | 3/1973 | Zeischegg | |
| 3,742,669 A | 7/1973 | Mansfeld | |
| 3,742,807 A | 7/1973 | Manning | |
| 3,760,547 A | 9/1973 | Brenneman | |
| 3,760,548 A | 9/1973 | Sauer et al. | |
| 3,765,465 A | 10/1973 | Gulistan | |
| 3,778,954 A | 12/1973 | Meserole | |
| 3,784,271 A | 1/1974 | Schreiber | |
| 3,849,235 A | 11/1974 | Gwynne | |
| 3,884,002 A | 5/1975 | Logie | |
| 3,885,845 A | 5/1975 | Krieks | |
| 3,919,820 A | 11/1975 | Green | |
| 3,950,915 A | 4/1976 | Cole | |
| 3,981,118 A | 9/1976 | Johnson et al. | |
| 4,007,994 A | 2/1977 | Brown | |
| 4,030,852 A | 6/1977 | Hein | |
| 4,064,571 A | 12/1977 | Phipps | |
| 4,080,086 A | 3/1978 | Watson | |
| 4,082,129 A | 4/1978 | Morelock | |
| 4,089,614 A | 5/1978 | Harley | |
| 4,099,293 A | 7/1978 | Pittasch | |
| 4,099,887 A | 7/1978 | Mackenroth | |
| 4,100,710 A | 7/1978 | Kowallik | |
| 4,107,892 A | 8/1978 | Bellem | |
| 4,113,399 A | 9/1978 | Hansen, Sr. | |
| 4,116,510 A | 9/1978 | Franco | |
| 4,142,271 A | 3/1979 | Busse | |
| 4,169,688 A | 10/1979 | Toshio | |
| 4,196,554 A | 4/1980 | Anderson et al. | |
| 4,211,379 A | 7/1980 | Morgan et al. | |
| 4,222,544 A | 9/1980 | Crowder | |
| 4,227,430 A | 10/1980 | Jansson et al. | |
| 4,279,397 A | 7/1981 | Larsson | |
| 4,299,067 A | 11/1981 | Bertschi | |
| 4,299,070 A | 11/1981 | Oltmanns et al. | |
| 4,304,083 A | 12/1981 | Anderson | |
| 4,308,961 A | 1/1982 | Kunce | |
| 4,324,517 A | 4/1982 | Dey | |
| 4,403,886 A | 9/1983 | Haeusler | |
| 4,405,253 A | 9/1983 | Stockum | |
| 4,426,820 A | 1/1984 | Terbrack et al. | |
| 4,447,172 A | 5/1984 | Galbreath | |
| 4,509,648 A | 4/1985 | Govang et al. | |
| 4,512,131 A | 4/1985 | Laramore | |
| 4,593,734 A | 6/1986 | Wallace | |
| 4,595,105 A | 6/1986 | Gold | |
| 4,597,122 A | 7/1986 | Handler et al. | |
| 4,599,841 A | 7/1986 | Haid | |
| 4,615,448 A | 10/1986 | Johnstonbaugh | |
| 4,629,076 A | 12/1986 | Amstutz et al. | |
| 4,648,165 A | 3/1987 | Whitehorne | |
| 4,750,794 A | 6/1988 | Vegh | |

(56) References Cited

U.S. PATENT DOCUMENTS

| | | |
|---|---|---|
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson et al. |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch et al. |
| 5,004,116 A | 4/1991 | Cattarozzi |
| 5,007,222 A | 4/1991 | Raymond |
| 5,018,323 A | 5/1991 | Clausen |
| 5,071,282 A | 12/1991 | Brown |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,148,850 A | 9/1992 | Urbanick |
| 5,173,012 A | 12/1992 | Ortwein et al. |
| 5,182,892 A | 2/1993 | Chase |
| 5,209,556 A | 5/1993 | Anderson |
| 5,212,925 A | 5/1993 | McClinton |
| 5,247,773 A | 9/1993 | Weir |
| 5,272,850 A | 12/1993 | Mysliwiec et al. |
| 5,299,509 A | 4/1994 | Ballard |
| 5,344,700 A | 9/1994 | McGath et al. |
| 5,348,778 A | 9/1994 | Knipp et al. |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,465,546 A | 11/1995 | Buse |
| 5,471,804 A | 12/1995 | Winter, IV |
| 5,475,960 A | 12/1995 | Lindal |
| 5,485,702 A | 1/1996 | Sholton |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A * | 7/1996 | Kvalheim ............... E06B 3/984 403/231 |
| 5,548,937 A | 8/1996 | Shimonohara |
| 5,598,682 A | 2/1997 | Haughian |
| 5,618,602 A | 4/1997 | Nelson |
| 5,634,309 A | 6/1997 | Polen |
| 5,658,086 A | 8/1997 | Brokaw et al. |
| 5,671,575 A | 9/1997 | Wu |
| 5,694,730 A | 12/1997 | Del et al. |
| 5,711,115 A | 1/1998 | Wirt |
| 5,755,068 A | 5/1998 | Ormiston |
| 5,775,521 A | 7/1998 | Tisbo |
| 5,810,505 A | 9/1998 | Henriott et al. |
| 5,882,098 A | 3/1999 | Brown et al. |
| 5,893,617 A | 4/1999 | Lee |
| 5,899,038 A | 5/1999 | Stroppiana |
| 5,941,026 A | 8/1999 | Eisenreich et al. |
| 5,944,294 A | 8/1999 | Baer |
| 5,950,389 A | 9/1999 | Porter |
| 5,970,675 A | 10/1999 | Schray |
| 6,006,486 A | 12/1999 | Moriau et al. |
| 6,029,416 A | 2/2000 | Andersson |
| 6,045,290 A | 4/2000 | Nocievski |
| 6,050,426 A | 4/2000 | Leurdijk |
| 6,052,960 A | 4/2000 | Yonemura |
| 6,065,262 A | 5/2000 | Motta |
| 6,142,436 A | 11/2000 | Thurston et al. |
| 6,173,548 B1 | 1/2001 | Hamar et al. |
| 6,182,410 B1 | 2/2001 | Pervan |
| 6,216,409 B1 | 4/2001 | Roy et al. |
| 6,312,186 B1 | 11/2001 | Roeck et al. |
| 6,314,701 B1 | 11/2001 | Meyerson |
| 6,349,507 B1 | 2/2002 | Muellerleile |
| 6,363,645 B1 | 4/2002 | Hunter |
| 6,363,677 B1 | 4/2002 | Chen et al. |
| 6,385,936 B1 | 5/2002 | Schneider |
| 6,413,007 B1 | 7/2002 | Lambright |
| 6,418,683 B1 | 7/2002 | Martensson et al. |
| 6,446,405 B1 | 9/2002 | Pervan |
| 6,446,413 B1 | 9/2002 | Gruber |
| 6,449,918 B1 | 9/2002 | Nelson et al. |
| 6,490,836 B1 | 12/2002 | Moriau et al. |
| 6,491,172 B2 | 12/2002 | Chance et al. |
| 6,505,452 B1 | 1/2003 | Hannig et al. |
| 6,547,086 B1 | 4/2003 | Harvey |
| 6,553,724 B1 | 4/2003 | Bigler |
| 6,578,498 B1 | 6/2003 | Draudt et al. |
| 6,591,568 B1 | 7/2003 | Paalsson |
| 6,601,359 B2 | 8/2003 | Olofsson |
| 6,617,009 B1 | 9/2003 | Chen et al. |
| 6,647,689 B2 | 11/2003 | Pletzer et al. |
| 6,647,690 B1 | 11/2003 | Martensson |
| 6,651,400 B1 | 11/2003 | Murphy |
| 6,670,019 B2 | 12/2003 | Andersson |
| 6,675,979 B2 | 1/2004 | Taylor |
| D486,676 S | 2/2004 | Campbell et al. |
| 6,685,391 B1 | 2/2004 | Gideon |
| 6,763,643 B1 | 7/2004 | Maartensson |
| 6,766,622 B1 | 7/2004 | Thiers |
| 6,769,219 B2 | 8/2004 | Schwitte et al. |
| 6,769,835 B2 | 8/2004 | Stridsman |
| 6,772,890 B2 | 8/2004 | Campbell et al. |
| 6,804,926 B1 | 10/2004 | Eisermann |
| 6,827,028 B1 | 12/2004 | Callaway |
| 6,854,235 B2 | 2/2005 | Martensson |
| 6,862,857 B2 | 3/2005 | Tychsen |
| 6,865,855 B2 | 3/2005 | Knauseder |
| 6,874,291 B1 | 4/2005 | Weber |
| 6,880,307 B2 | 4/2005 | Schwitte et al. |
| 6,948,716 B2 | 9/2005 | Drouin |
| 6,971,614 B2 | 12/2005 | Fischer et al. |
| 7,021,019 B2 | 4/2006 | Knauseder |
| 7,040,068 B2 | 5/2006 | Moriau et al. |
| 7,051,486 B2 | 5/2006 | Pervan |
| 7,108,031 B1 | 9/2006 | Secrest |
| 7,121,058 B2 | 10/2006 | Palsson et al. |
| 7,127,860 B2 | 10/2006 | Pervan et al. |
| 7,137,229 B2 | 11/2006 | Pervan |
| 7,152,383 B1 | 12/2006 | Wilkinson et al. |
| 7,188,456 B2 | 3/2007 | Knauseder |
| 7,219,392 B2 | 5/2007 | Mullet et al. |
| 7,223,045 B2 | 5/2007 | Migli |
| 7,228,977 B2 | 6/2007 | Perkins et al. |
| 7,251,916 B2 | 8/2007 | Konzelmann et al. |
| 7,257,926 B1 | 8/2007 | Kirby |
| 7,300,120 B2 | 11/2007 | Shin |
| 7,337,588 B1 | 3/2008 | Moebus |
| 7,377,081 B2 | 5/2008 | Ruhdorfer |
| 7,451,535 B2 | 11/2008 | Wells et al. |
| 7,451,578 B2 | 11/2008 | Hannig |
| 7,454,875 B2 | 11/2008 | Pervan et al. |
| 7,516,588 B2 | 4/2009 | Pervan |
| 7,533,500 B2 | 5/2009 | Morton et al. |
| 7,556,849 B2 | 7/2009 | Thompson et al. |
| 7,568,322 B2 | 8/2009 | Pervan |
| 7,584,583 B2 | 9/2009 | Bergelin et al. |
| 7,614,197 B2 | 11/2009 | Nelson |
| 7,614,350 B2 | 11/2009 | Tuttle et al. |
| 7,617,651 B2 | 11/2009 | Grafenauer |
| 7,621,092 B2 | 11/2009 | Groeke et al. |
| 7,634,884 B2 | 12/2009 | Pervan et al. |
| 7,637,068 B2 | 12/2009 | Pervan |
| 7,641,414 B1 | 1/2010 | Joyce |
| 7,654,055 B2 | 2/2010 | Ricker |
| 7,677,005 B2 | 3/2010 | Pervan |
| 7,716,889 B2 | 5/2010 | Pervan |
| 7,717,278 B2 | 5/2010 | Kao |
| 7,721,503 B2 | 5/2010 | Pervan et al. |
| 7,726,088 B2 | 6/2010 | Muehlebach |
| 7,757,452 B2 | 7/2010 | Pervan |

(56) References Cited

U.S. PATENT DOCUMENTS

| | | |
|---|---|---|
| 7,793,450 B2 | 9/2010 | Chasmer et al. |
| 7,802,411 B2 | 9/2010 | Pervan et al. |
| 7,806,624 B2 | 10/2010 | McLean et al. |
| 7,818,939 B2 | 10/2010 | Bearinger et al. |
| 7,841,144 B2 | 11/2010 | Pervan |
| 7,841,145 B2 | 11/2010 | Pervan et al. |
| 7,841,150 B2 | 11/2010 | Pervan |
| 7,861,482 B2 | 1/2011 | Pervan et al. |
| 7,866,110 B2 | 1/2011 | Pervan |
| 7,908,815 B2 | 3/2011 | Pervan et al. |
| 7,930,862 B2 | 4/2011 | Bergelin et al. |
| 7,980,039 B2 | 7/2011 | Groeke et al. |
| 7,980,041 B2 | 7/2011 | Pervan et al. |
| 7,998,549 B2 * | 8/2011 | Susnjara ............... A47B 67/04 29/466 |
| 8,033,074 B2 | 10/2011 | Pervan et al. |
| 8,038,363 B2 | 10/2011 | Hannig et al. |
| 8,042,311 B2 | 10/2011 | Pervan et al. |
| 8,061,104 B2 | 11/2011 | Pervan |
| 8,079,196 B2 | 12/2011 | Pervan |
| 8,112,967 B2 | 2/2012 | Pervan et al. |
| 8,146,754 B2 | 4/2012 | Apgood et al. |
| 8,171,692 B2 | 5/2012 | Pervan |
| 8,181,416 B2 | 5/2012 | Pervan et al. |
| 8,220,217 B2 | 7/2012 | Muehlebach |
| 8,234,830 B2 | 8/2012 | Pervan et al. |
| 8,302,367 B2 | 11/2012 | Schulte |
| 8,336,272 B2 | 12/2012 | Prager et al. |
| 8,341,914 B2 | 1/2013 | Pervan et al. |
| 8,341,915 B2 | 1/2013 | Pervan et al. |
| 8,353,140 B2 | 1/2013 | Pervan et al. |
| 8,359,805 B2 | 1/2013 | Pervan et al. |
| 8,365,499 B2 | 2/2013 | Nilsson et al. |
| 8,381,477 B2 | 2/2013 | Pervan et al. |
| 8,387,327 B2 | 3/2013 | Pervan |
| 8,448,402 B2 | 5/2013 | Pervan et al. |
| 8,464,408 B2 | 6/2013 | Hazzard |
| 8,495,849 B2 | 7/2013 | Pervan |
| 8,499,521 B2 | 8/2013 | Pervan et al. |
| 8,505,257 B2 | 8/2013 | Boo et al. |
| 8,528,289 B2 | 9/2013 | Pervan et al. |
| 8,544,230 B2 | 10/2013 | Pervan |
| 8,602,227 B1 | 12/2013 | McDonald |
| 8,615,952 B2 | 12/2013 | Engstrom |
| 8,627,862 B2 | 1/2014 | Pervan et al. |
| 8,640,424 B2 | 2/2014 | Pervan et al. |
| 8,650,626 B2 | 2/2014 | Miyabayashi et al. |
| 8,689,512 B2 | 4/2014 | Pervan |
| 8,707,650 B2 | 4/2014 | Pervan et al. |
| 8,713,886 B2 | 5/2014 | Pervan et al. |
| 8,733,065 B2 | 5/2014 | Pervan |
| 8,733,410 B2 | 5/2014 | Pervan |
| 8,745,952 B2 | 6/2014 | Perra et al. |
| 8,763,341 B2 | 7/2014 | Pervan |
| 8,764,137 B2 | 7/2014 | Fehre |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Hakansson et al. |
| 8,898,988 B2 | 12/2014 | Pervan |
| 9,175,703 B2 * | 11/2015 | Maertens ............. A47B 47/042 |
| 9,216,541 B2 | 12/2015 | Boo et al. |
| 9,290,948 B2 | 3/2016 | Cappelle et al. |
| 9,538,842 B2 | 1/2017 | Hkansson et al. |
| 9,599,139 B2 * | 3/2017 | Sauer ..................... F16B 12/46 |
| 9,745,756 B2 | 8/2017 | Hannig |
| 9,758,973 B2 | 9/2017 | Segaert et al. |
| 9,809,983 B2 | 11/2017 | Trudel |
| 10,202,996 B2 | 2/2019 | Hkansson et al. |
| 10,378,570 B2 | 8/2019 | Broughton |
| 10,415,613 B2 | 9/2019 | Boo |
| 10,448,739 B2 | 10/2019 | Derelov et al. |
| 10,451,097 B2 | 10/2019 | Brnnstrm et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelv et al. |
| 10,724,564 B2 | 7/2020 | Derelv |
| 10,731,688 B2 | 8/2020 | Brnnstrm et al. |
| 10,736,416 B2 | 8/2020 | Derelv et al. |
| 10,830,266 B2 | 11/2020 | Fridlund |
| 10,871,179 B2 | 12/2020 | Hkansson et al. |
| 10,876,562 B2 | 12/2020 | Pervan |
| 10,876,563 B2 | 12/2020 | Derelv et al. |
| 10,968,936 B2 | 4/2021 | Boo et al. |
| 11,076,691 B2 | 8/2021 | Boo |
| 11,083,287 B2 | 8/2021 | Boo et al. |
| 11,246,415 B2 | 2/2022 | Derelov et al. |
| 11,428,253 B2 | 8/2022 | Hakansson et al. |
| 2001/0024707 A1 | 9/2001 | Andersson et al. |
| 2002/0031646 A1 | 3/2002 | Chen et al. |
| 2002/0046433 A1 | 4/2002 | Sellman et al. |
| 2002/0069611 A1 | 6/2002 | Leopolder |
| 2002/0100231 A1 | 8/2002 | Miller et al. |
| 2002/0170258 A1 | 11/2002 | Schwitte et al. |
| 2002/0170259 A1 | 11/2002 | Ferris |
| 2002/0178674 A1 | 12/2002 | Pervan |
| 2002/0178680 A1 | 12/2002 | Martensson et al. |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0084636 A1 | 5/2003 | Pervan |
| 2003/0094230 A1 | 5/2003 | Sjoberg |
| 2003/0101674 A1 | 6/2003 | Pervan et al. |
| 2003/0101681 A1 | 6/2003 | Tychsen |
| 2003/0154676 A1 | 8/2003 | Schwartz |
| 2003/0180091 A1 | 9/2003 | Stridsman |
| 2003/0188504 A1 | 10/2003 | Ralf |
| 2003/0196405 A1 | 10/2003 | Pervan |
| 2004/0016196 A1 | 1/2004 | Pervan |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0107659 A1 | 6/2004 | Glockl |
| 2004/0123548 A1 | 7/2004 | Gimpel et al. |
| 2004/0128934 A1 | 7/2004 | Hecht |
| 2004/0137180 A1 | 7/2004 | Sjoberg et al. |
| 2004/0139676 A1 | 7/2004 | Knauseder |
| 2004/0139678 A1 | 7/2004 | Pervan |
| 2004/0165946 A1 | 8/2004 | Areh et al. |
| 2004/0168392 A1 | 9/2004 | Konzelmann et al. |
| 2004/0177584 A1 | 9/2004 | Pervan |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hanning |
| 2004/0250492 A1 | 12/2004 | Becker |
| 2004/0255541 A1 | 12/2004 | Thiers et al. |
| 2004/0261348 A1 | 12/2004 | Vulin |
| 2005/0028474 A1 | 2/2005 | Kim |
| 2005/0042027 A1 | 2/2005 | Migli |
| 2005/0050827 A1 | 3/2005 | Schitter |
| 2005/0104483 A1 | 5/2005 | Saravis |
| 2005/0138881 A1 | 6/2005 | Pervan |
| 2005/0160694 A1 | 7/2005 | Pervan |
| 2005/0166514 A1 | 8/2005 | Pervan |
| 2005/0210810 A1 | 9/2005 | Pervan |
| 2005/0235593 A1 | 10/2005 | Hecht |
| 2005/0236544 A1 | 10/2005 | Mancino et al. |
| 2005/0247653 A1 | 11/2005 | Brooks |
| 2006/0064940 A1 | 3/2006 | Cappelle |
| 2006/0070333 A1 | 4/2006 | Pervan |
| 2006/0091093 A1 | 5/2006 | Armari |
| 2006/0099386 A1 | 5/2006 | Smith |
| 2006/0101769 A1 * | 5/2006 | Pervan .................. F16B 5/0004 52/591.1 |
| 2006/0156670 A1 | 7/2006 | Knauseder |
| 2006/0180561 A1 | 8/2006 | Wisnoski et al. |
| 2006/0236642 A1 | 10/2006 | Pervan |
| 2006/0260254 A1 | 11/2006 | Pervan |
| 2006/0273085 A1 | 12/2006 | Casto |
| 2007/0006543 A1 | 1/2007 | Engstrom |
| 2007/0028547 A1 | 2/2007 | Grafenauer et al. |

(56) References Cited

U.S. PATENT DOCUMENTS

| | | |
|---|---|---|
| 2007/0065293 A1 | 3/2007 | Hannig |
| 2007/0108679 A1 | 5/2007 | Grothaus |
| 2007/0151189 A1 | 7/2007 | Yang |
| 2007/0175143 A1 | 8/2007 | Pervan et al. |
| 2007/0175156 A1 | 8/2007 | Pervan et al. |
| 2007/0193178 A1 | 8/2007 | Groeke et al. |
| 2007/0209736 A1 | 9/2007 | Deringor et al. |
| 2008/0000185 A1 | 1/2008 | Duernberger |
| 2008/0000186 A1 | 1/2008 | Pervan et al. |
| 2008/0000187 A1 | 1/2008 | Pervan |
| 2008/0005989 A1 | 1/2008 | Pervan et al. |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0066415 A1 | 3/2008 | Pervan et al. |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan |
| 2008/0134614 A1 | 6/2008 | Pervan et al. |
| 2008/0155930 A1 | 7/2008 | Pervan et al. |
| 2008/0172971 A1 | 7/2008 | Pervan |
| 2008/0193209 A1 | 8/2008 | Henderson |
| 2008/0216434 A1 | 9/2008 | Pervan |
| 2008/0216435 A1 | 9/2008 | Nolan |
| 2008/0216920 A1 | 9/2008 | Pervan |
| 2008/0236088 A1 | 10/2008 | Hannig |
| 2008/0244882 A1 | 10/2008 | Woxman et al. |
| 2008/0263975 A1 | 10/2008 | Mead |
| 2008/0295432 A1 | 12/2008 | Pervan et al. |
| 2009/0014401 A1 | 1/2009 | Tallman |
| 2009/0019806 A1 | 1/2009 | Muehlebach |
| 2009/0064624 A1 | 3/2009 | Sokol |
| 2009/0100782 A1 | 4/2009 | Groeke et al. |
| 2009/0133353 A1 | 5/2009 | Pervan et al. |
| 2009/0151290 A1 | 6/2009 | Liu |
| 2009/0155612 A1 | 6/2009 | Pervan et al. |
| 2009/0193741 A1 | 8/2009 | Cappelle |
| 2009/0193748 A1 | 8/2009 | Boo et al. |
| 2009/0193753 A1 | 8/2009 | Schitter |
| 2009/0308014 A1 | 12/2009 | Muehlebach |
| 2010/0028592 A1 | 2/2010 | Barkdoll et al. |
| 2010/0043333 A1 | 2/2010 | Hannig |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2010/0293879 A1 | 11/2010 | Pervan et al. |
| 2010/0300030 A1 | 12/2010 | Pervan et al. |
| 2010/0300031 A1 | 12/2010 | Pervan et al. |
| 2010/0319290 A1 | 12/2010 | Pervan et al. |
| 2010/0319291 A1 | 12/2010 | Pervan et al. |
| 2011/0016815 A1 | 1/2011 | Yang |
| 2011/0023303 A1 | 2/2011 | Pervan et al. |
| 2011/0030303 A1 | 2/2011 | Pervan et al. |
| 2011/0041996 A1 | 2/2011 | Pervan |
| 2011/0088344 A1 | 4/2011 | Pervan et al. |
| 2011/0088345 A1 | 4/2011 | Pervan |
| 2011/0131916 A1 | 6/2011 | Chen et al. |
| 2011/0138722 A1 | 6/2011 | Hannig |
| 2011/0154763 A1 | 6/2011 | Bergelin et al. |
| 2011/0167750 A1 | 7/2011 | Pervan |
| 2011/0167751 A1 | 7/2011 | Engstrom |
| 2011/0197535 A1 | 8/2011 | Baker et al. |
| 2011/0225921 A1 | 9/2011 | Schulte |
| 2011/0225922 A1 | 9/2011 | Pervan et al. |
| 2011/0252733 A1 | 10/2011 | Pervan et al. |
| 2011/0271632 A1 | 11/2011 | Cappelle et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0017533 A1 | 1/2012 | Pervan et al. |
| 2012/0027967 A1 | 2/2012 | Maertens et al. |
| 2012/0031029 A1 | 2/2012 | Pervan et al. |
| 2012/0036804 A1 | 2/2012 | Pervan |
| 2012/0073235 A1 | 3/2012 | Hannig |
| 2012/0124932 A1 | 5/2012 | Schulte et al. |
| 2012/0145845 A1 | 6/2012 | Hightower |
| 2012/0151865 A1 | 6/2012 | Pervan et al. |
| 2012/0174515 A1 | 7/2012 | Pervan et al. |
| 2012/0174520 A1 | 7/2012 | Pervan |
| 2012/0174521 A1 | 7/2012 | Schulte |
| 2012/0180416 A1 | 7/2012 | Perra et al. |
| 2012/0192521 A1 | 8/2012 | Schulte |
| 2012/0279161 A1 | 11/2012 | Hakansson et al. |
| 2012/0286637 A1 | 11/2012 | Fehre |
| 2013/0008117 A1 | 1/2013 | Pervan |
| 2013/0014463 A1 | 1/2013 | Pervan |
| 2013/0019555 A1 | 1/2013 | Pervan et al. |
| 2013/0042562 A1 | 2/2013 | Pervan et al. |
| 2013/0042563 A1 | 2/2013 | Pervan et al. |
| 2013/0042564 A1 | 2/2013 | Pervan et al. |
| 2013/0042565 A1 | 2/2013 | Pervan et al. |
| 2013/0047536 A1 | 2/2013 | Pervan |
| 2013/0048632 A1 | 2/2013 | Chen |
| 2013/0055950 A1 | 3/2013 | Pervan et al. |
| 2013/0071172 A1 | 3/2013 | Maertens et al. |
| 2013/0081349 A1 | 4/2013 | Pervan et al. |
| 2013/0097846 A1 | 4/2013 | Pettigrew et al. |
| 2013/0111845 A1 | 5/2013 | Pervan et al. |
| 2013/0145708 A1 | 6/2013 | Pervan |
| 2013/0160391 A1 | 6/2013 | Pervan et al. |
| 2013/0170904 A1 | 7/2013 | Cappelle et al. |
| 2013/0232905 A2 | 9/2013 | Pervan |
| 2013/0239508 A1 | 9/2013 | Darko et al. |
| 2013/0263454 A1 | 10/2013 | Boo et al. |
| 2013/0263547 A1 | 10/2013 | Boo |
| 2013/0287484 A1 | 10/2013 | Phillips |
| 2013/0318906 A1 | 12/2013 | Pervan et al. |
| 2014/0007539 A1 | 1/2014 | Pervan et al. |
| 2014/0013919 A1 | 1/2014 | Gerke et al. |
| 2014/0020324 A1 | 1/2014 | Pervan |
| 2014/0033634 A1 | 2/2014 | Pervan |
| 2014/0053497 A1 | 2/2014 | Pervan et al. |
| 2014/0055018 A1 | 2/2014 | Shein et al. |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Darko |
| 2014/0109506 A1 | 4/2014 | Pervan et al. |
| 2014/0111076 A1 | 4/2014 | Devos et al. |
| 2014/0123586 A1 | 5/2014 | Pervan et al. |
| 2014/0190112 A1 | 7/2014 | Pervan et al. |
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0305065 A1 | 10/2014 | Pervan |
| 2014/0366476 A1 | 12/2014 | Pervan et al. |
| 2015/0035422 A1 | 2/2015 | Hakansson et al. |
| 2015/0078807 A1 | 3/2015 | Brnnstrm et al. |
| 2015/0078819 A1 | 3/2015 | Derelv et al. |
| 2015/0196118 A1 | 7/2015 | Derelv |
| 2015/0198191 A1 | 7/2015 | Boo |
| 2015/0330088 A1* | 11/2015 | Derelov ............ E04F 15/02038 52/588.1 |
| 2016/0007751 A1 | 1/2016 | Derelv |
| 2016/0174704 A1 | 6/2016 | Boo et al. |
| 2016/0270531 A1 | 9/2016 | Derelv |
| 2017/0079433 A1 | 3/2017 | Derelov et al. |
| 2017/0089379 A1 | 3/2017 | Pervan |
| 2017/0097033 A1 | 4/2017 | Hakansson et al. |
| 2017/0159291 A1 | 6/2017 | Derelv |
| 2017/0208938 A1 | 7/2017 | Derelv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelv |
| 2017/0328072 A1 | 11/2017 | Hannig |
| 2017/0360193 A1 | 12/2017 | Boo et al. |

(56) References Cited

U.S. PATENT DOCUMENTS

| | | |
|---|---|---|
| 2018/0080488 A1 | 3/2018 | Derelv |
| 2018/0087552 A1 | 3/2018 | Derelv et al. |
| 2018/0112695 A1 | 4/2018 | Boo et al. |
| 2018/0119717 A1 | 5/2018 | Derelv |
| 2018/0178406 A1 | 6/2018 | Fransson et al. |
| 2018/0202160 A1 | 7/2018 | Derelv |
| 2018/0328396 A1 | 11/2018 | Fransson et al. |
| 2019/0113061 A1 | 4/2019 | Hakansson et al. |
| 2019/0166989 A1 | 6/2019 | Boo et al. |
| 2019/0191870 A1 | 6/2019 | Derelv |
| 2019/0195256 A1 | 6/2019 | Derelv |
| 2019/0289999 A1 | 9/2019 | Derelv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelv |
| 2019/0323535 A1 | 10/2019 | Derelv |
| 2020/0003242 A1 | 1/2020 | Brnnstrm et al. |
| 2020/0055126 A1 | 2/2020 | Fridlund |
| 2020/0069048 A1 | 3/2020 | Derelv et al. |
| 2020/0069049 A1 | 3/2020 | Derelv et al. |
| 2020/0102978 A1 | 4/2020 | Fridlund |
| 2020/0121076 A1 | 4/2020 | Derelov et al. |
| 2020/0214447 A1 | 7/2020 | Derelov et al. |
| 2020/0300284 A1 | 9/2020 | Pervan |
| 2020/0337455 A1 | 10/2020 | Boo et al. |
| 2020/0340513 A1 | 10/2020 | Derelv |
| 2021/0047840 A1 | 2/2021 | Pervan |
| 2021/0079650 A1 | 3/2021 | Derelov |
| 2021/0148392 A1 | 5/2021 | Brnnstrm et al. |
| 2021/0180630 A1 | 6/2021 | Bruno et al. |
| 2021/0190112 A1 | 6/2021 | Derelv |
| 2021/0222716 A1 | 7/2021 | Derelv et al. |
| 2021/0285480 A1 | 9/2021 | Derelv et al. |
| 2021/0381251 A1 | 12/2021 | Svensson |
| 2022/0018373 A1 | 1/2022 | Boo |
| 2022/0049735 A1 | 2/2022 | Meijer |
| 2022/0186761 A1 | 6/2022 | Derelv et al. |
| 2022/0213912 A1 | 7/2022 | Boo |
| 2022/0228615 A1 | 7/2022 | Sostar |
| 2022/0243751 A1 | 8/2022 | Brännström et al. |
| 2022/0252097 A1 | 8/2022 | Rydsjö et al. |

FOREIGN PATENT DOCUMENTS

| | | | |
|---|---|---|---|
| CH | 365507 A | 11/1962 | |
| CH | 685276 A5 | 5/1995 | |
| CH | 696889 A5 * | 1/2008 | F16B 12/26 |
| CH | 696889 A5 | 1/2008 | |
| CH | 698988 B1 | 12/2009 | |
| CN | 101099618 A | 1/2008 | |
| CN | 201588375 U | 9/2010 | |
| CN | 203424576 U | 2/2014 | |
| DE | 1107910 B | 5/1961 | |
| DE | 2414104 A1 | 10/1975 | |
| DE | 2514357 A1 | 10/1975 | |
| DE | 2635237 A1 | 2/1978 | |
| DE | 3103281 A1 | 8/1982 | |
| DE | 0228872 A1 | 10/1985 | |
| DE | 3932980 A1 | 11/1991 | |
| DE | 4229115 A1 | 3/1993 | |
| DE | 9417168 U1 | 2/1995 | |
| DE | 19831936 A1 | 2/1999 | |
| DE | 29820031 U1 | 2/1999 | |
| DE | 19805538 A1 | 8/1999 | |
| DE | 29922649 U1 | 3/2000 | |
| DE | 19940837 A1 | 11/2000 | |
| DE | 19958225 A1 | 6/2001 | |
| DE | 20206460 U1 | 7/2002 | |
| DE | 20205774 U1 | 8/2002 | |
| DE | 20304761 U1 | 4/2004 | |
| DE | 29924630 U1 | 5/2004 | |
| DE | 20320799 U1 | 4/2005 | |
| DE | 102004055951 A1 | 7/2005 | |
| DE | 102004001363 A1 | 8/2005 | |
| DE | 202005019986 U1 | 2/2006 | |
| DE | 202004017486 U1 | 4/2006 | |
| DE | 102004054368 A1 | 5/2006 | |
| DE | 102005024366 A1 | 11/2006 | |
| DE | 102006024184 A1 | 11/2007 | |
| DE | 102006037614 B3 | 12/2007 | |
| DE | 102006057491 A1 | 6/2008 | |
| DE | 102007018309 A1 | 8/2008 | |
| DE | 202008011589 U1 | 11/2008 | |
| DE | 102007032885 A1 | 1/2009 | |
| DE | 102007035648 A1 | 1/2009 | |
| DE | 102007049792 A1 | 2/2009 | |
| DE | 202009008825 U1 | 10/2009 | |
| DE | 102008035293 A1 | 2/2010 | |
| DE | 102009048050 B3 | 1/2011 | |
| DE | 102009041142 A1 | 3/2011 | |
| DE | 102013008595 A1 | 11/2013 | |
| DE | 202014100090 U1 | 11/2014 | |
| DE | 102014110124 A1 | 1/2016 | |
| EP | 0013852 A1 | 8/1980 | |
| EP | 0060203 A2 | 9/1982 | |
| EP | 0357129 A1 | 3/1990 | |
| EP | 0362968 A1 | 4/1990 | |
| EP | 0675332 A2 | 10/1995 | |
| EP | 0871156 A2 | 10/1998 | |
| EP | 0974713 A1 | 1/2000 | |
| EP | 1048423 A2 | 11/2000 | |
| EP | 1308577 A2 | 5/2003 | |
| EP | 1350904 A2 | 10/2003 | |
| EP | 1357239 A2 | 10/2003 | |
| EP | 1420125 A2 | 5/2004 | |
| EP | 1437457 A2 | 7/2004 | |
| EP | 1640530 A2 | 3/2006 | |
| EP | 1650375 A1 | 4/2006 | |
| EP | 1671562 A1 | 6/2006 | |
| EP | 1863984 A1 | 12/2007 | |
| EP | 1922954 A1 | 5/2008 | |
| EP | 1980683 A2 | 10/2008 | |
| EP | 2017403 A2 | 1/2009 | |
| EP | 2037128 A1 | 3/2009 | |
| EP | 2333353 A2 | 6/2011 | |
| EP | 2487373 A1 | 8/2012 | |
| EP | 3031998 A1 | 6/2016 | |
| FR | 1138595 A | 6/1957 | |
| FR | 2062731 A5 | 6/1971 | |
| FR | 2256807 A1 | 8/1975 | |
| FR | 2517187 A1 | 6/1983 | |
| FR | 2597173 A1 | 10/1987 | |
| FR | 2602013 A1 | 1/1988 | |
| FR | 2810060 A1 | 12/2001 | |
| GB | 0240629 | 10/1925 | |
| GB | 0245332 A | 1/1926 | |
| GB | 0376352 A | 7/1932 | |
| GB | 0799155 A | 8/1958 | |
| GB | 1022377 A | 3/1966 | |
| GB | 1171337 A | 11/1969 | |
| GB | 2051916 A | 1/1981 | |
| GB | 2163825 A | 3/1986 | |
| GB | 2315988 A | 2/1998 | |
| GB | 2445954 A | 7/2008 | |
| GB | 2482213 A | 1/2012 | |
| JP | 53-113160 U | 9/1978 | |
| JP | 03-110258 A | 5/1991 | |
| JP | 05-018028 A | 1/1993 | |
| JP | 06-022606 U | 3/1994 | |
| JP | 06-288017 A | 10/1994 | |
| JP | 06-306961 A | 11/1994 | |
| JP | 06-322848 A | 11/1994 | |
| JP | 07-300979 A | 11/1995 | |
| JP | 08-086080 A | 4/1996 | |
| JP | 2003-239921 A | 8/2003 | |
| KR | 10-1147274 B1 | 5/2012 | |
| KR | 10-2014-0042314 A | 4/2014 | |
| WO | 87/07339 A1 | 12/1987 | |
| WO | 90/07066 A2 | 6/1990 | |
| WO | 94/26999 A1 | 11/1994 | |
| WO | 97/47834 A1 | 12/1997 | |
| WO | 98/22677 A1 | 5/1998 | |
| WO | 99/22150 A1 | 5/1999 | |

(56) References Cited

FOREIGN PATENT DOCUMENTS

| | | |
|---|---|---|
| WO | 99/41508 A2 | 8/1999 |
| WO | 00/20705 A1 | 4/2000 |
| WO | 00/43281 A2 | 7/2000 |
| WO | 00/47841 A1 | 8/2000 |
| WO | 00/55067 A1 | 9/2000 |
| WO | 00/66856 A1 | 11/2000 |
| WO | 01/02669 A1 | 1/2001 |
| WO | 01/02670 A1 | 1/2001 |
| WO | 01/02672 A1 | 1/2001 |
| WO | 01/48332 A1 | 7/2001 |
| WO | 01/51732 A1 | 7/2001 |
| WO | 01/51733 A1 | 7/2001 |
| WO | 01/53628 A1 | 7/2001 |
| WO | 01/66877 A1 | 9/2001 |
| WO | 01/75247 A1 | 10/2001 |
| WO | 01/77461 A1 | 10/2001 |
| WO | 01/98604 A1 | 12/2001 |
| WO | 02/48127 A2 | 6/2002 |
| WO | 02/55809 A1 | 7/2002 |
| WO | 02/55810 A1 | 7/2002 |
| WO | 03/12224 A1 | 2/2003 |
| WO | 03/16654 A1 | 2/2003 |
| WO | 03/25307 A1 | 3/2003 |
| WO | 03/27510 A2 | 4/2003 |
| WO | 03/74814 A1 | 9/2003 |
| WO | 03/78761 A1 | 9/2003 |
| WO | 03/83234 A1 | 10/2003 |
| WO | 03/87497 A1 | 10/2003 |
| WO | 03/89736 A1 | 10/2003 |
| WO | 2004/016877 A1 | 2/2004 |
| WO | 2004/020764 A1 | 3/2004 |
| WO | 2004/053257 A1 | 6/2004 |
| WO | 2004/079130 A1 | 9/2004 |
| WO | 2004/083557 A1 | 9/2004 |
| WO | 2004/085765 A1 | 10/2004 |
| WO | 2005/003488 A1 | 1/2005 |
| WO | 2005/054599 A1 | 6/2005 |
| WO | 2005/068747 A1 | 7/2005 |
| WO | 2006/043893 A1 | 4/2006 |
| WO | 2006/050928 A1 | 5/2006 |
| WO | 2006/103500 A1 | 10/2006 |
| WO | 2006/104436 A1 | 10/2006 |
| WO | 2006/123988 A1 | 11/2006 |
| WO | 2007/015669 A2 | 2/2007 |
| WO | 2007/079845 A1 | 7/2007 |
| WO | 2007/089186 A1 | 8/2007 |
| WO | 2007/142589 A1 | 12/2007 |
| WO | 2008/004960 A2 | 1/2008 |
| WO | 2008/017281 A1 | 2/2008 |
| WO | 2008/017301 A2 | 2/2008 |
| WO | 2008/060232 A1 | 5/2008 |
| WO | 2007/141605 A3 | 6/2008 |
| WO | 2008/068245 A1 | 6/2008 |
| WO | 2008/150234 A1 | 12/2008 |
| WO | 2009/021487 A1 | 2/2009 |
| WO | 2009/116926 A1 | 9/2009 |
| WO | 2010/023042 A1 | 3/2010 |
| WO | 2010/070472 A2 | 6/2010 |
| WO | 2010/070605 A2 | 6/2010 |
| WO | 2010/082171 A2 | 7/2010 |
| WO | 2010/087752 A1 | 8/2010 |
| WO | 2010/108980 A1 | 9/2010 |
| WO | 2010/136171 A1 | 12/2010 |
| WO | 2011/001326 A2 | 1/2011 |
| WO | 2011/012104 A2 | 2/2011 |
| WO | 2011/032540 A2 | 3/2011 |
| WO | 2011/085710 A1 | 7/2011 |
| WO | 2011/127981 A1 | 10/2011 |
| WO | 2011/151737 A2 | 12/2011 |
| WO | 2011/151758 A2 | 12/2011 |
| WO | WO-2011151737 A2 * | 12/2011 ........... A47B 47/042 |
| WO | WO-2011151758 A2 * | 12/2011 ......... A47B 47/0066 |
| WO | 2012/095454 A1 | 7/2012 |
| WO | WO-2012095454 A1 * | 7/2012 ......... A47B 47/0025 |
| WO | 2012/154113 A1 | 11/2012 |
| WO | 2013/009257 A1 | 1/2013 |
| WO | 2013/025163 A1 | 2/2013 |
| WO | 2013/080160 A1 | 6/2013 |
| WO | 2013/118075 A1 | 8/2013 |
| WO | WO-2013118075 A1 * | 8/2013 ........... A47B 47/042 |
| WO | 2015/105450 A1 | 7/2015 |
| WO | 2015/105451 A1 | 7/2015 |
| WO | 2017/052456 A1 | 3/2017 |

OTHER PUBLICATIONS

U.S. Appl. No. 17/524,293, Hans Brännström, Agne Palsson and Peter Derelöv, filed Nov. 11, 2021 (Cited herein as US Patent Application Publication No. 2022/0243751 A1 of Aug. 4, 2022).

U.S. Appl. No. 17/398,416, Thomas Meijer, filed Aug. 10, 2021 (Cited herein as US Patent Application Publication No. 2022/0049735 A1 of Feb. 17, 2022).

U.S. Appl. No. 17/546,356, Peter Derelöv and Hans Brännström, filed Dec. 9, 2021 (Cited herein as US Patent Application Publication No. 2022/0186761 A1 of Jun. 16, 2022).

U.S. Appl. No. 17/556,146, Christian Boo, filed Dec. 20, 2021 (Cited herein as US Patent Application Publication No. 2022/0213912 A1 of Jul. 7, 2022).

U.S. Appl. No. 17/514,055, Marko Sostar, filed Oct. 29, 2021 (Cited herein as US Patent Application Publication No. 2022/0228615 A1 of Jul. 21, 2022).

U.S. Appl. No. 17/665,160, Oscar Rydsjö, Marko Sostar and Patrik Carlsson, filed Feb. 4, 2022 (Cited herein as US Patent Application Publication No. 2022/0252097 A1 of Aug. 11, 2022).

U.S. Appl. No. 15/642,757, Peter Derelöv, filed Jul. 6, 2017 (Cited herein as US Patent Application Publication No. 2017/0298973 A1 of Oct. 19, 2017).

U.S. Appl. No. 16/722,096, Peter Derelöv and Christian Boo, filed Dec. 20, 2019 (Cited herein as US Patent Application Publication No. 2020/0121076 A1 of Apr. 23, 2020).

U.S. Appl. No. 15/956,949, Peter Derelöv, filed Apr. 19, 2018 (Cited herein as US Patent Application Publication No. 2019/0323535 A1 of Oct. 24, 2019).

U.S. Appl. No. 15/978,630, Jonas Fransson and Niclas Håkansson, filed May 14, 2018 (Cited herein as US Patent Application Publication No. 2018/0328396 A1 of Nov. 15, 2018).

U.S. Appl. No. 16/220,574, Peter Derelöv, filed Dec. 14, 2018 (Cited herein as US Patent Application Publication No. 2019/0195256 A1 of Jun. 27, 2019).

U.S. Appl. No. 16/386,874, Peter Derelöv, filed Apr. 17, 2019 (Cited herein as US Patent Application Publication No. 2019/0323534 A1 of Oct. 24, 2019).

U.S. Appl. No. 17/126,518, Peter Derelöv, filed Dec. 18, 2020 (Cited herein as US Patent Application Publication No. 2021/0190112 A1 of Jun. 24, 2021).

U.S. Appl. No. 17/119,392, Jimmie Bruno and Zoran Simunic, filed Dec. 11, 2020 (Cited herein as US Patent Application Publication No. 2021/0180630 A1 of Jun. 17, 2021).

U.S. Appl. No. 17/847,655, Thomas Meijer, filed Jun. 23, 2022 (Cited herein as US Patent Application Publication No. 2022/0408921 A1 of Dec. 29, 2022).

Engstrand, Ola (Contact)/Valinge Innovation AB, Technical Disclosure entitled "VA-038 Mechanical Locking of Floor Panels With Vertical Folding," IP com No. IPCOM000179246D, Feb. 10, 2009, IP.com Prior Art Database, 59 pages.

Engstrand, Ola (Contact)/Valinge Innovation AB, Technical Disclosure entitled "VA055 Mechanical locking system for floor panels," IP com No. IPCOM000206454D, Apr. 27, 2011, IP.com Prior Art Database, 25 pages.

Engstrand, Ola (Contact)/Valinge Innovation AB, Technical Disclosure entitled "VA058 Rocker Tongue," IP com No. IPCOM000203832D, Feb. 4, 2011, IP.com Prior Art Database, 22 pages.

Engstrand, Ola (Owner)/Valinge Innovation AB, Technical Disclosure entitled "VA043b PCT Mechanical Locking of Floor Panels," IP com No. IPCOM000189420D, Nov. 9, 2009, IP.com Prior Art Database, 62 pages.

(56) References Cited

OTHER PUBLICATIONS

Engstrand, Ola, Valinge Innovation AB. va043 5G Linear Slide Tongue, IRN-ISSN 1533-0001 IP.com No. IPCOM000179015D Retrieved from: Epoquenet; Database XPIPCOM, Accession No. AN. XP013129255, Feb. 4, 2009, 126 pages.

Extended European Search issued in EP Patent Application No. 12782144.5, dated Aug. 14, 2014, European Patent Office, Munich DE, 9 pages.

Extended European Search Report issued in EP Patent Application No. 17202290.7, dated Feb. 12, 2018, European Patent Office, Munich, DE, 10 pages.

Extended European Search Report issued in EP Patent Application No. 19217996.8, dated Jan. 31, 2020, European Patent Office, Munich, DE, 11 pages.

International Search Report dated Aug. 2, 2012 in PCT/SE2012/050475, Swedish Patent Office, Stockholm, Sweden, 8 pages.

Pervan, Darko (Author), Technical Disclosure entitled "VA069 Combi Tongue," IP com No. IPCOM000210866D, Sep. 13, 2011, IP.com Prior Art Database, 41 pages.

Pervan, Darko (Author), Technical Disclosure entitled "VA070 Strip Part," IP com No. IPCOM000210867D, Sep. 13, 2011, IP.com Prior Art Database, 43 pages.

Pervan, Darko (Author), Technical Disclosure entitled "VA071 Pull Lock," IP com No. IPCOM000210868D, Sep. 13, 2011, IP.com Prior Art Database, 22 pages.

Pervan, Darko (Author), Technical Disclosure entitled "VA073a Zip Loc," IP com No. IPCOM000210869D, Sep. 13, 2011, IP.com Prior Art Database, 36 pages.

Pervan, Darko (Author)/Valinge Flooring Technology, Technical Disclosure entitled "VA066b Glued Tongue," IP com No. IPCOM000210865D, Sep. 13, 2011, IP.com Prior Art Database, 19 pages.

Pervan, Darko (Author)/Valinge Flooring Technology, Technical Disclosure entitled "VA068 Press Lock VFT," IP com No. IPCOM000208854D, Jul. 20, 2011, IP.com Prior Art Database, 25 pages.

Vaiinge Innovation AB, Technical Disclosure entitled "Mechanical locking for floor panels with a flexible bristle tongue," IP.com No. IPCOM000145262D, Jan. 12, 2007, IP.com PriorArtDatabase, 57 pages.

\* cited by examiner

MECHANICAL LOCKING SYSTEM FOR BUILDING PANELS

CROSS REFERENCE TO RELATED APPLICATIONS

The present application is a continuation of U.S. application Ser. No. 16/951,394, filed on Nov. 18, 202, which is a continuation of U.S. application Ser. No. 16/228,975, filed on Dec. 21, 2018, now U.S. Pat. No. 10,871,179, which is a continuation of U.S. application Ser. No. 15/379,791, filed on Dec. 15, 2016, now U.S. Pat. No. 10,202,996, which is a continuation of U.S. application Ser. No. 14/515,988, filed on Oct. 16, 2014, now U.S. Pat. No. 9,538,842, which is a continuation of U.S. application Ser. No. 13/464,512, filed on May 4, 2012, now U.S. Pat. No. 8,887,468, which claims the benefit of U.S. Provisional Application No. 61/483,444, filed on May 6, 2011. The entire contents of each of U.S. application Ser. No. 16/951,394, U.S. application Ser. No. 16/228,975, U.S. application Ser. No. 15/379,791, U.S. U.S. application Ser. No. 14/515,988, application Ser. No. 13/464,512, U.S. Provisional Application No. 61/483,444 and Swedish Application No. 1150400-8 are hereby incorporated herein by reference.

TECHNICAL FIELD

The disclosure relates to the field of mechanical locking systems for building panels, especially furniture components with mechanical locking systems, which are intended to lock preferably perpendicular to each other.

FIELD OF APPLICATION OF EMBODIMENTS

Embodiments of the present invention are particularly suitable for use in furniture components, which are preferably formed of sheet shaped panels and which are joined mechanically with a locking system integrated with the panel, i.e. mounted at the factory. The following description of known technology, problems of known systems and objects and features of the invention will therefore, as a non-restrictive example, be aimed above all at this field of application and in particular at furniture components formed as rectangular panels intended to be mechanically joined on one pair of opposite edges perpendicularly to other adjacent panels. The panels may also be square.

It should be emphasized that the invention can be applied to any type of sheet shaped panel such as for example wood based HDF, particle board and plywood, plastic sheet shaped materials, mineral fibre and metal based materials, stone and ceramics and similar. It may be used to connect furniture components, and elements for packaging boxes and similar. It may also be used to lock components, which for example have a cylinder form such as table legs.

BACKGROUND

Furniture such as kitchen cabinets, bookshelves, drawers, tables and similar are generally supplied as flat components in order to save transportation costs. The customer must assemble them. Several methods are used to assemble such furniture components, for example, glue, spikes, screws and similar. Snapping connections comprising plastic components are widely used to connect, for example, drawers.

Known Technology and Problems Thereof

There are a lot of problems connected with the assembly of furniture components especially when one panel should be connected perpendicularly to another panel. Generally special connection devices are supplied that have to be inserted into grooves and holes. Such assembly is complicated and time consuming and the connection is often not strong enough. Snapping connections formed in plastic materials are expensive and complicated to produce. It would be an advantage if assembly may be simplified and if no loose parts would be needed in order to connect panels to each other in a firm, cost efficient and rigid manner.

WO 2010/070472 describes locking systems that may be used to assemble furniture components with angling and snapping. The locking systems may be formed in one piece with the panel or, alternatively, a separate plastic tongue with an outer flexible snap tab may be used. Such locking systems do not give sufficient strength and rigidity especially when rather soft core materials, such as particleboard, are used. The locking system is complicated to produce since the flexible tongue cannot be connected to the components with a linear displacement into a groove. The outer flexible part is generally not strong enough to provide a rigid connection.

SUMMARY

A basic objective of embodiments of the present invention is to provide an improved mechanical locking system which may be produced in a cost effective way and which allows preferably rectangular panels to be connected and assembled mechanically perpendicularly to each other with a strong locking and in a simple manner without the need for loose parts that has to be used during assembly.

The above objects of embodiments of the invention are achieved wholly or partly by mechanical locking systems and panels, according to the independent claim that provide a stronger and easier locking. Embodiments of the invention are evident from the dependent claims and from the description and drawings.

A first aspect of the invention is a set of panels comprising a first and a second panel. An edge of the second panel is insertable into a groove of the first panel, when the panels are arranged essential perpendicular to each other, to obtain a mechanical connection between the first and the second panel, when the second panel is displaced essentially perpendicularly to the first panel. The edge comprises a separate and flexible tongue and said groove comprises a tongue groove, or said edge comprises a tongue groove and said groove comprises a separate and flexible tongue. The separate and flexible tongue is insertable into the tongue groove for connecting said panels to each other in a first direction, which is parallel to a main plane of the first panel. The edge of the second panel is configured to cooperate with the groove of the first panel for connecting said panels to each other in a second direction, which is parallel to a main plane (MP) of the second panel. The length direction of the separate and flexible tongue extends parallel with said edge and/or groove. The groove preferably comprises an opening, two sidewalls and a bottom. The separate and flexible tongue is arranged in an insertion groove. The separate and flexible tongue has an inner part mounted in the insertion groove and an outer part extending outside an opening of the insertion groove. A part of the separate tongue is displaced in the insertion groove during locking. The flexible tongue is preferably displaceable inwardly towards a bottom of the insertion groove and outwardly into the tongue groove during locking.

The tongue may comprise two opposite displacement surfaces located between the inner and outer parts of the separate and flexible tongue. One or both of said two opposite displacement surfaces may be displaceable against a wall(s) of the insertion groove during locking.

A locking involving displacement of a displacement surface against an upper or lower wall of the insertion groove may make it possible use a tongue with a rigid outer part. That may facilitate a strong locking even in rather soft materials such a particle boards that are often used a base material in furniture components. The outer rigid part may be displaced into a rather deep tongue groove and a firm locking may be obtained.

Said insertion groove may be inclined upwards with the opening closer to the main plane of the panel than the inner part of the insertion groove. Such inclination may facilitate the insertion of the separate tongue into the insertion groove during production since the tongue may be inserted with a linear motion into the displacement groove.

The separate and flexible tongue may, when the edge of the second panel is inserted into the groove of the first panel, lock by snapping.

The inner part may be fixed in the insertion groove by e.g. friction connection or by glue.

The inner part of the tongue may comprise one or several flexible protrusions extending in the length direction of the tongue.

The first and/or the second panel may comprise separate materials that form an edge or a groove portion. A particle-board panel may be reinforced with solid wood, plywood, HDF and similar wood based materials that are glued or mechanically connected to the panels in order to form at least a part of the locking system.

The second panel may have an outer edge with a smaller thickness than the thickness of the panel body such that the panel body overlaps one or both parts of the groove opening when the second panel is inserted into the groove of the first panel.

At least a part of the tongue and/or the groove may be formed in the first and the second panel respectively before a part of the tongue and/or the groove, and preferably a part of the panel, may be covered by a layer, such as a foil.

The above-described locking system allows that panels may be locked automatically perpendicularly to each other with a snap action and without any loose parts. The flexible tongue provides a strong and easy locking in middle sections and in corner sections.

The tongue is preferably factory connected but it may of course be delivered separately in blanks or as a separate loose component and inserted into a groove during installation.

The panels may not be only connectable perpendicular to each other but may also be connectable to each other at an angle of less than 180° between the main planes of the first and the second panel or preferably in the range of about 45° to about 135°.

DESCRIPTION OF EMBODIMENTS

To facilitate understanding, several locking systems in the figures are shown schematically. It should be emphasized that improved or different functions can be achieved using combinations of the preferred embodiments.

Figure 1A:
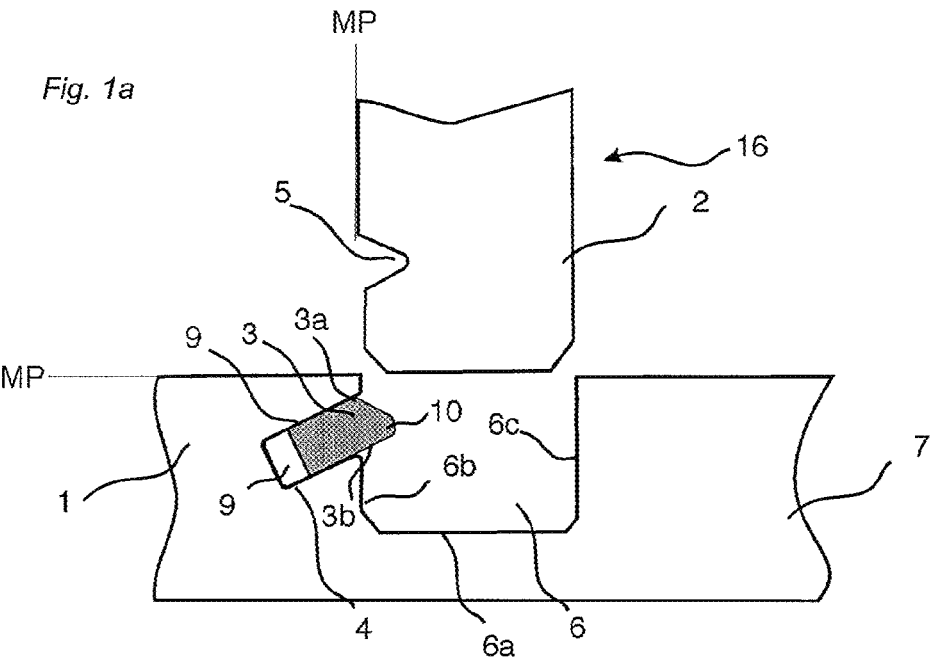
FIGS. 1a-1c illustrate a perpendicular snap action of a middle section according to an embodiment of the invention.
Figure 1B:
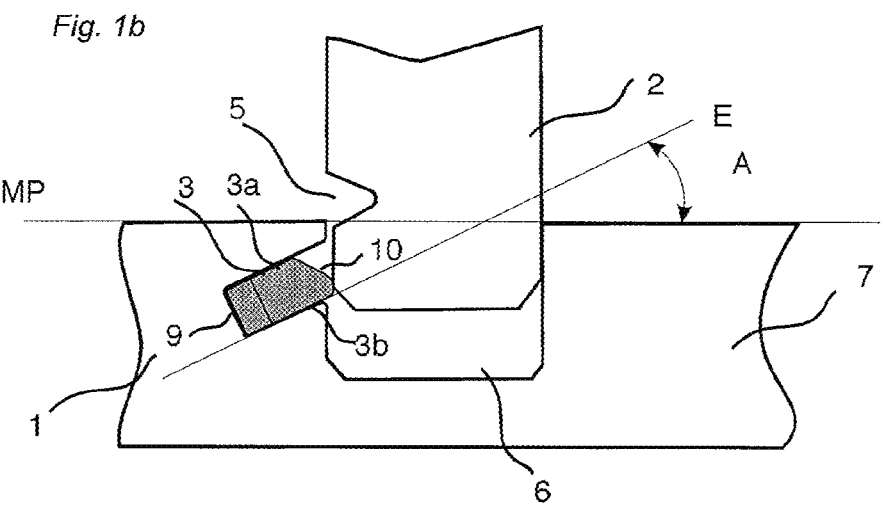
Figure 1C:
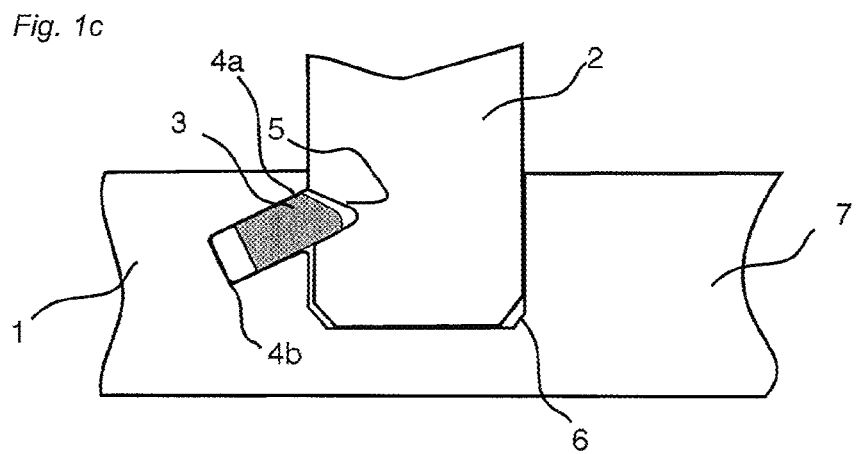

FIGS. 1a-1c show a connection with a perpendicular snap action according to a preferred embodiment of the invention. FIG. 1a shows a first 1 and a second 2 panel. The first panel 1 comprises a groove 6, formed in the panel core 7. The groove comprises a bottom 6a and two opposite groove walls 6b, 6c. The groove is open towards a main plane MP of the first panel 1. An insertion groove 4 is formed in one of the groove walls 6b. The insertion groove 4 is preferably inclined in relation to the main plane MP of the panel such that the opening of the insertion groove 4a is closer to the main plane MP than the inner part 4b. It is preferred that a linear extension E of the insertion groove extends at or more preferably above the opening of the groove 6. This makes it possible to form the insertion groove with large rotating tools and to insert a separate tongue 3 into the groove. The insertion groove is preferably inclined with an angle A of about 10-45 degrees. The insertion groove comprises a flexible tongue 3, which has an inner part 9 and an outer part 10 and preferably two opposite sliding surfaces 3a and 3b between the inner 9 and the outer 10 parts.

FIG. 1b shows how the flexible tongue 3 with its displacement surfaces 3a, 3b is displaced inwardly into the insertion groove 4 when the second panel 2 is inserted into the groove 6 perpendicularly to the first panel 1.

FIG. 1c shows how the flexible tongue 3 is displaced in the insertion groove outwardly into the tongue groove 5 such that the second panel is connected perpendicular and parallel to the first panel with preferably a snap action. The flexible tongue and the tongue groove lock the panels perpendicularly to the main plane MP of the first panel 1. The groove 6 and the edge 16 of the second panel lock the panels parallel to the main plane MP of the first panel 1. The flexible tongue 3 may be locked with pre tension into the tongue groove 5.

Figure 2A:
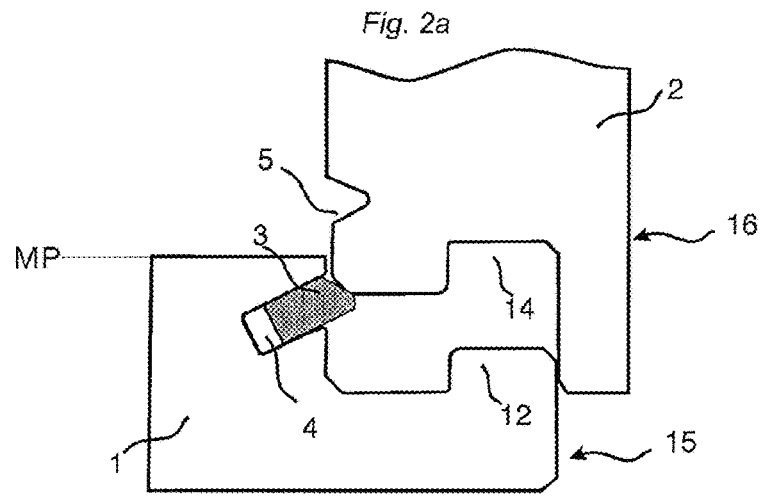
FIGS. 2a-2b illustrate a corner section according to an embodiment of the invention.
Figure 2B:
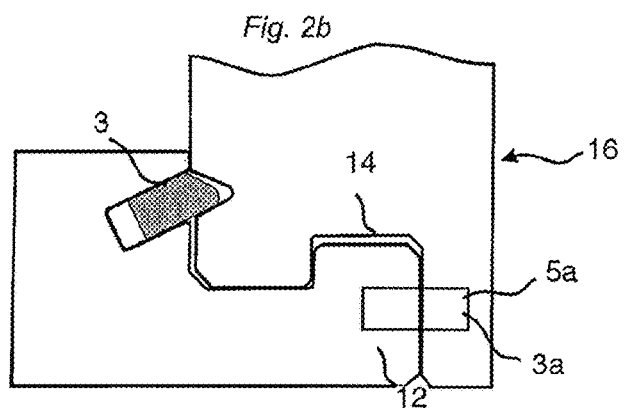

FIGS. 2a and 2b show another preferred embodiment of the invention where the edge 15, of the first panel comprises a locking element 12 and the edge 16 of the second panel comprises a locking groove 14. The locking element and the locking groove locks the panels parallel to the main plane of the first panel. This embodiment may be used to connect corner sections. A tongue and a tongue groove 5a may also be located and formed on the outer part of the locking element 12 and/or in a groove wall of the locking groove 14 as shown in FIG. 2b. There may be a space between the outer part of the locking element 12 and the locking groove, or a play or a tight fit. The insertion groove 4 may be formed in the second panel and the tongue groove 5 in the first panel. The insertion groove and/or the locking surfaces between the flexible tongue and the tongue groove may be inclined or essentially parallel to the main plane MP of the first panel.

Figure 2C:
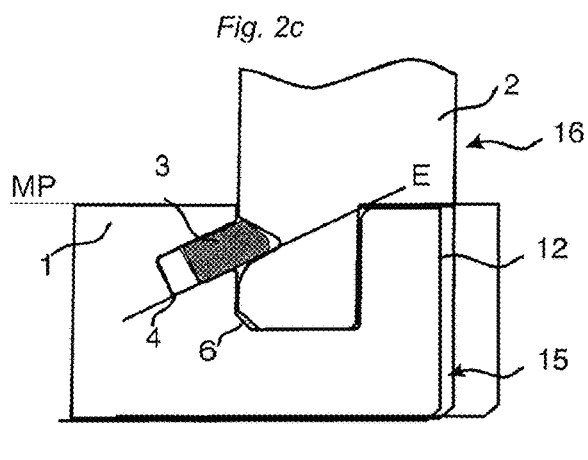
FIGS. 2c-2d illustrate corner section or middle sections according to embodiments of the invention.

FIG. 2c shows an alternative embodiment, which may be used to connect corner sections or middle sections. The edge 15, of the first panel 1, comprises a locking element 12 that in locked position forms an outer free end of the panel. The flexible tongue 3 is displaced inwardly into the insertion groove 4 when the second panel 2 is inserted into the groove 6 perpendicularly to the first panel 1. The inclination of the insertion groove 4 facilitates the insertion of the flexible tongue 3 into the insertion groove 4 during production and locking may be accomplished with lower resistance since the flexible tongue 3 slides inwardly and downwardly during locking. The insertion groove is preferably inclined such that an extension E of its lower part is located at or above the upper part of the locking element 12.

Figure 2D:
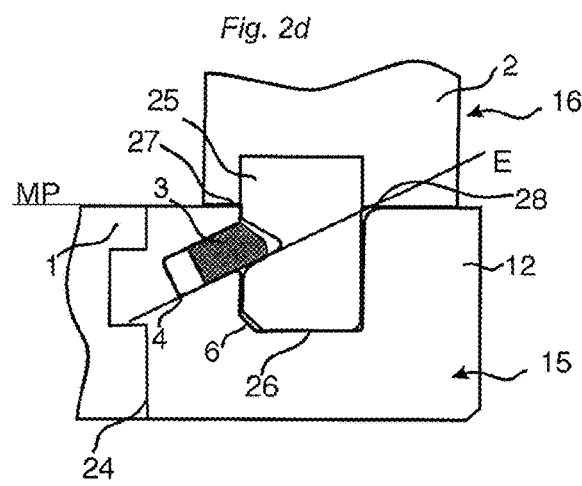

FIG. 2d shows that the second panel 2 may have an outer edge 26 with a smaller thickness than the panel body 2 such that the panel body 2 overlaps one 27 or both parts 27, 28 of the groove opening when the second panel 2 is inserted into the groove 6 of the first panel 1. The first and/or the second panel may comprise separate materials 24, 25 that form an edge or a groove portion of the first or the second panels. A particle board panel may for example be reinforced with solid wood, plywood, HDF and similar wood based materials that are glued or mechanically connected to the panel in order to form at least a part of the locking system. Separate materials may be covered with for example a foil, paper or paint.

Figure 3A:
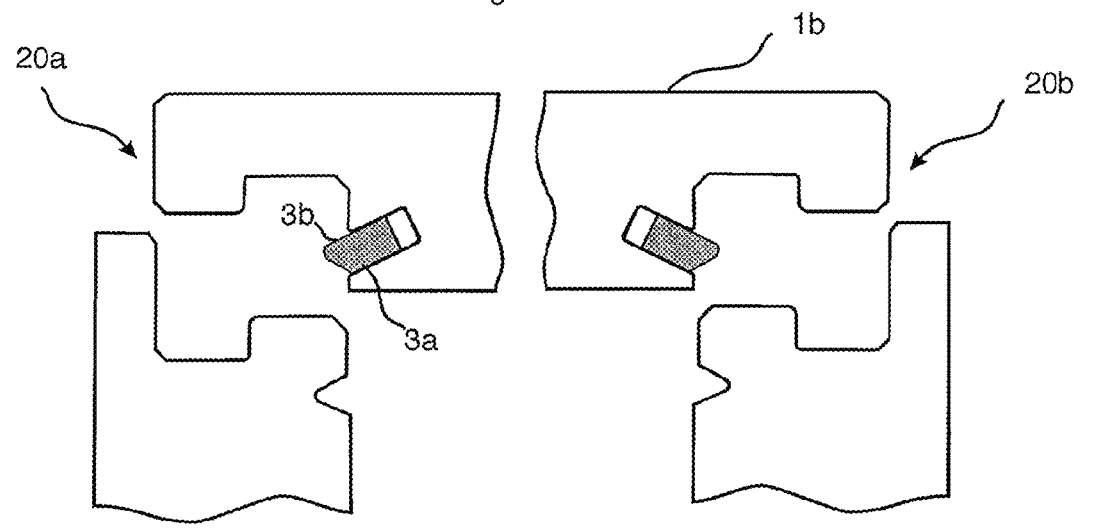
FIGS. 3a-3b illustrate locking of four panels and a corner section according to embodiments of the invention.
Figure 3A:
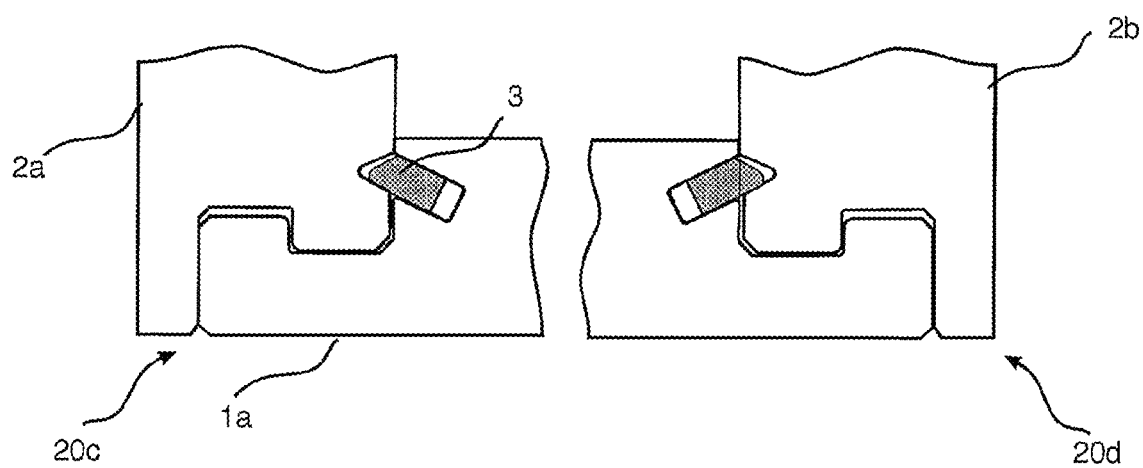

FIG. 3a shows a connection of four corner sections 20a, b, c, d. Four panels of for example a kitchen cabinet may be connected. A first panel 1a is placed on a floor. A second 2a and a third 2b panel are connected with snapping to the first panel 1a. Finally a fourth panel 1b is connected to the second and third panels.

Figure 3B:
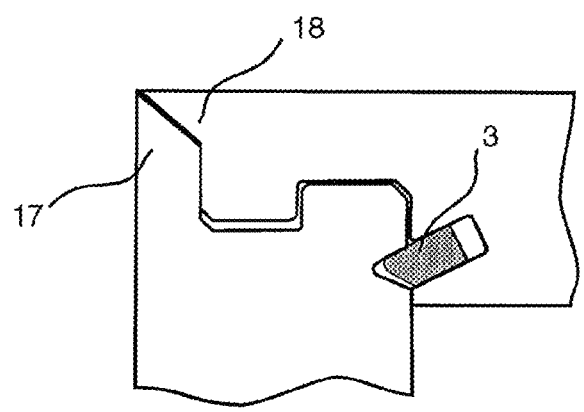

FIG. 3b shows a corner section where the adjacent panel edges 17, 18 are inclined, preferably inwardly and preferably with an angle of about 45 degrees against the main plane of the panels.

Figure 4A:
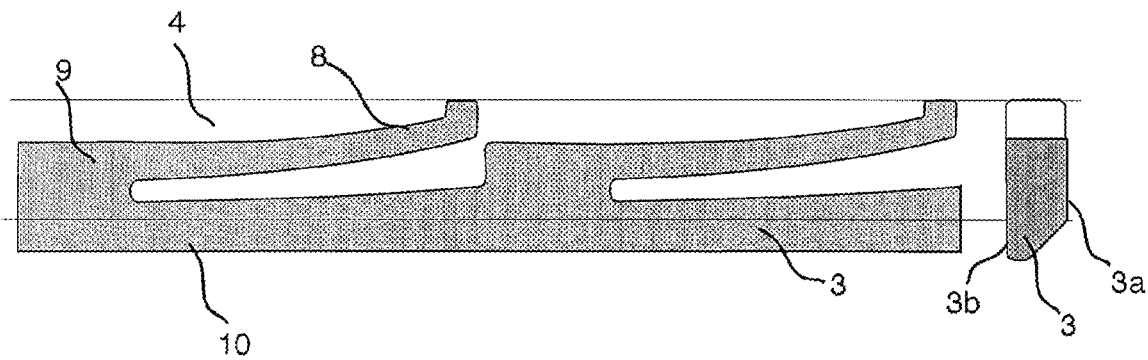
FIGS. 4a-4d illustrate a bristle tongue and a bow shaped tongue according to embodiments of the invention.
Figure 4B:
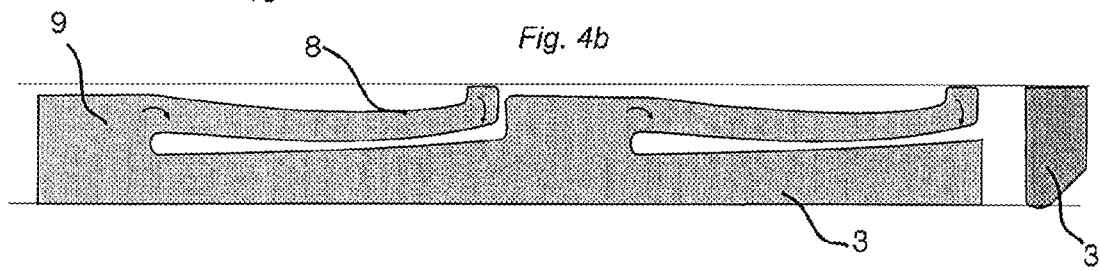
Figure 4C:
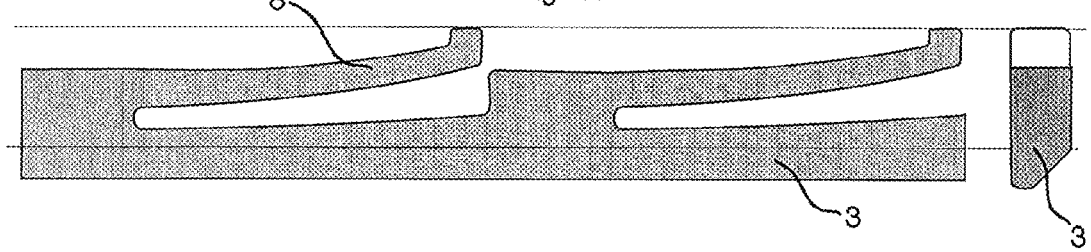

FIGS. 4a-4c show a known flexible bristle tongue 3, which is used to connect floor panels. Such a tongue may be used to connect panels according to embodiments of the invention. The tongue comprises flexible protrusions 8 that bend in the length direction of the tongue and that displace the tongue in the insertion groove during the snap action. FIG. 4a shows the tongue in the outer position prior to locking, FIG. 4b shows the tongue 3 in the inner position during locking, and FIG. 4c shows the tongue 3 in the outer and locked position.

Figure 4D:
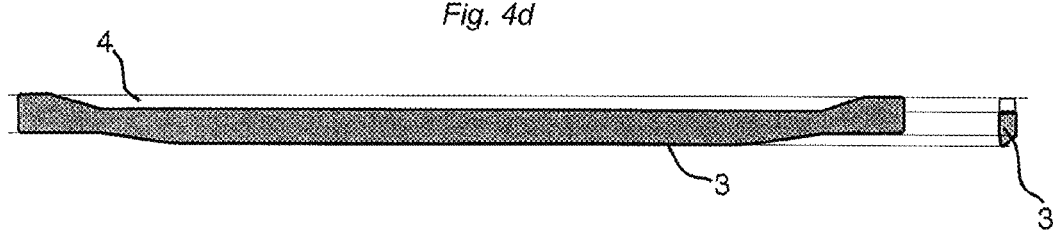

FIG. 4d shows a flexible bow shaped tongue 3 that bends in the length direction.

All known flexible tongues that are used to lock floor panels may be used in embodiments of this invention. Tongues that bend in the length direction are preferred, for example, bristle tongues and bow shaped tongues, as shown in FIGS. 4a and 4d, since such tongues have the advantage that flexibility may be combined with a rigid and strong outer part that creates a strong locking even in rather soft core materials such as particle boards that are generally used as a core in furniture components. It is an advantage if the tongue creates a pre tension against the tongue groove in locked position. This gives a stronger locking and eliminates production tolerances especially if the locking surface of the tongue/tongue groove is inclined against the main plane of the first panel. The tongue is preferably formed of an injection moulded plastic material preferably reinforced with glass fibres.

Figure 5A:
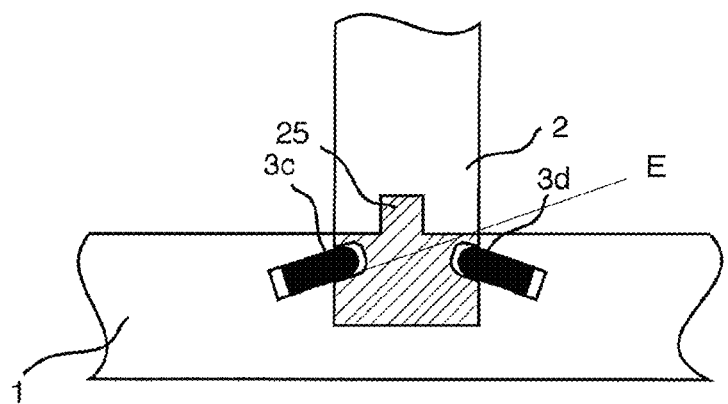
FIGS. 5a-5c illustrate embodiments of the invention.

FIG. 5a shows an embodiment with two tongues 3c, 3d. The edge of the second panel 2 may comprise a separate material 25.

Figure 5B:
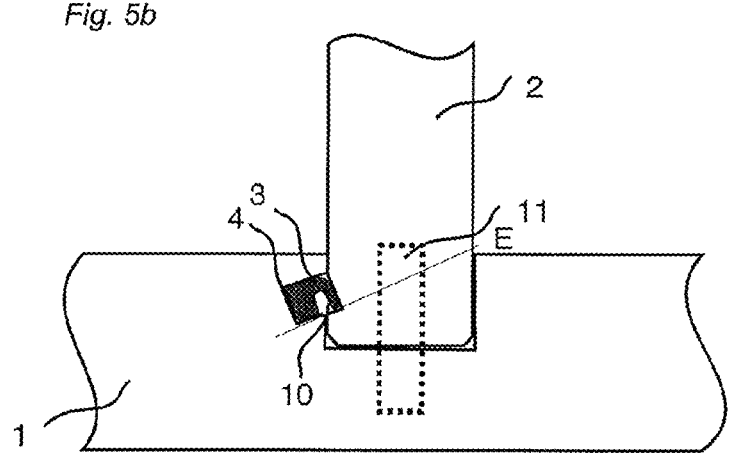

FIG. 5b shows a tongue 3 that comprise an outer part 4 with a snap tab that during snapping is displaced at least partly into an inclined insertion groove 4. The locking system comprises a stabilizing tongue 11 that may be formed in one piece with the core or inserted as a separate element.

Figure 5C:
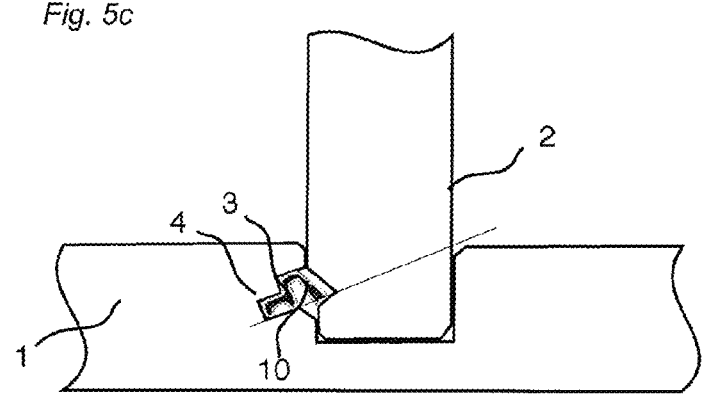

FIG. 5c shows a tongue 3 comprising a snap tab 10 that during snapping is displaced outside the insertion groove 4.

Figure 6A:
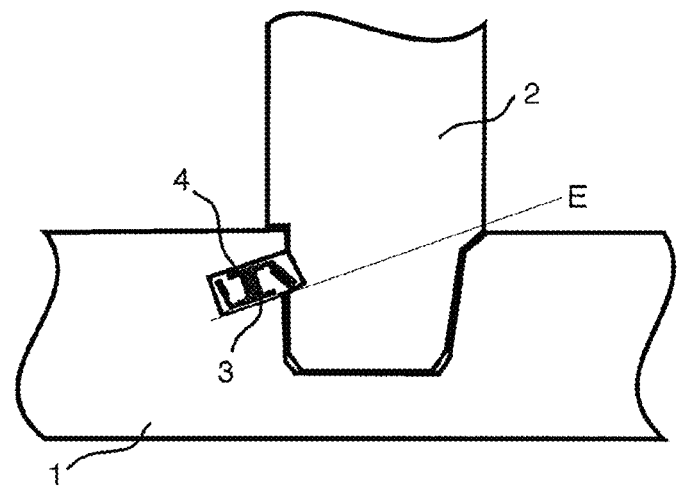
FIGS. 6a-6c illustrate embodiments of the invention.
Figure 6B:
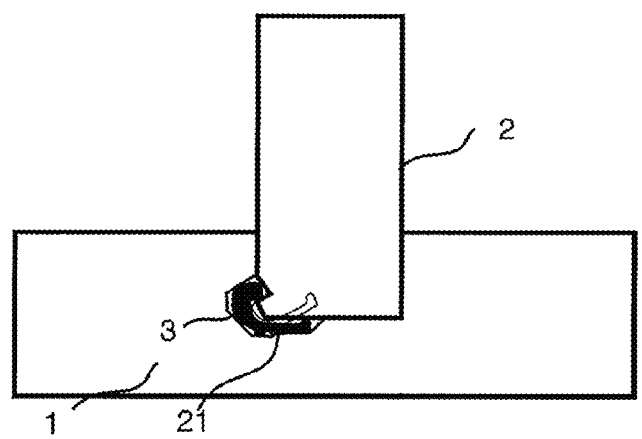

FIG. 6a shows a tongue that comprises an inner and outer flexible part. FIG. 6b shows an embodiment with a turning and snapping tongue 3 comprising a pressing arm 21 that turns and snaps the tongue 3 into a tongue groove.

Figure 6C:
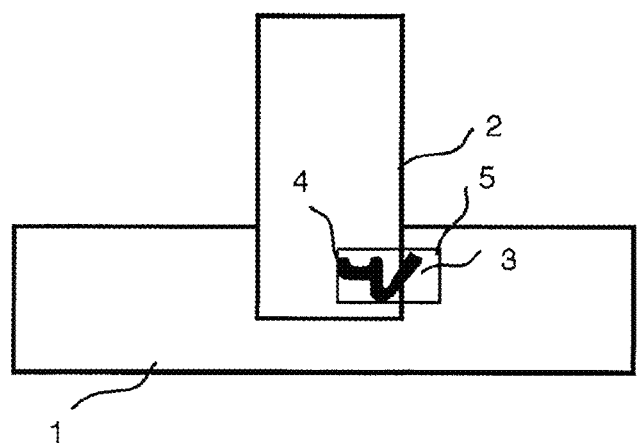

FIG. 6c shows schematically that the insertion groove 4 may be formed in the second panel 2.

Figure 7A:
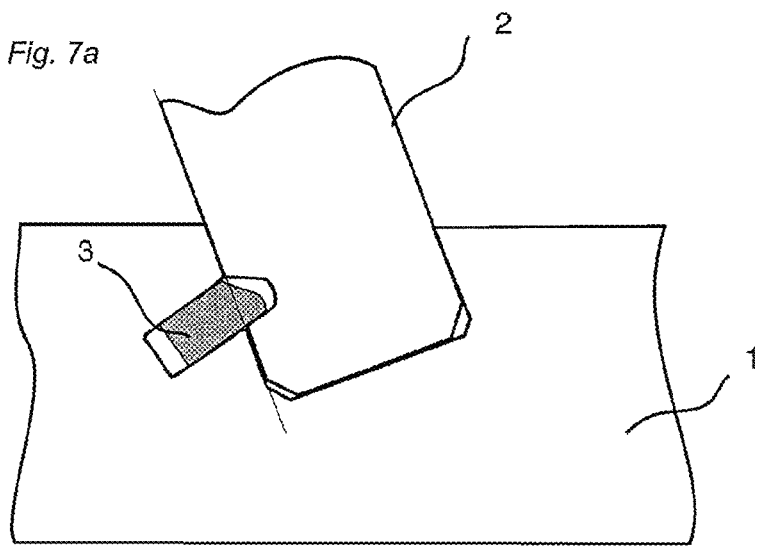
FIGS. 7a-7c illustrate embodiments of the invention.
Figure 7B:
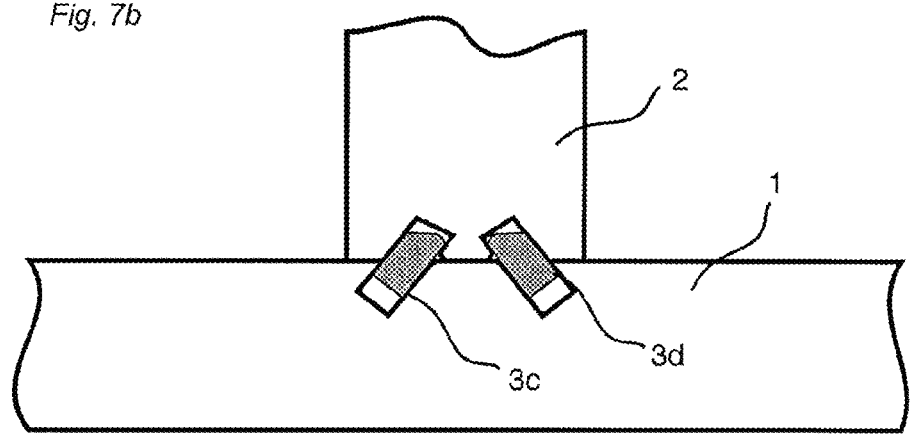
Figure 7C:
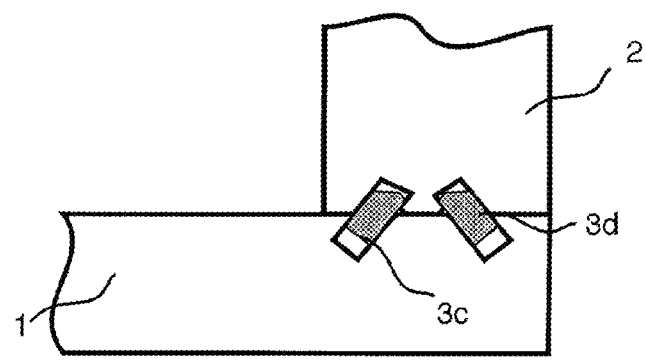

FIGS. 7a-7c show alternative positions of the flexible tongues. FIG. 7a shows that the second panel may be somewhat inclined for example 45-89 degrees against main plane of the first panel. FIG. 7b shows two tongues 3c, 3d attached to a middle section of a first panel 1 and FIG. 7c shows a corner section.

Figure 8A:
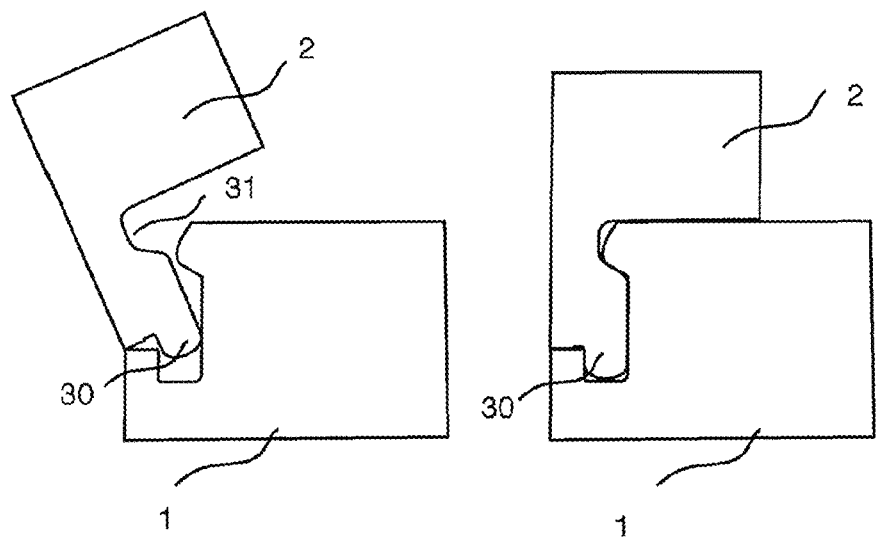
FIGS. 8a-8b illustrate an angling connection according to embodiments of the invention.
Figure 8B:
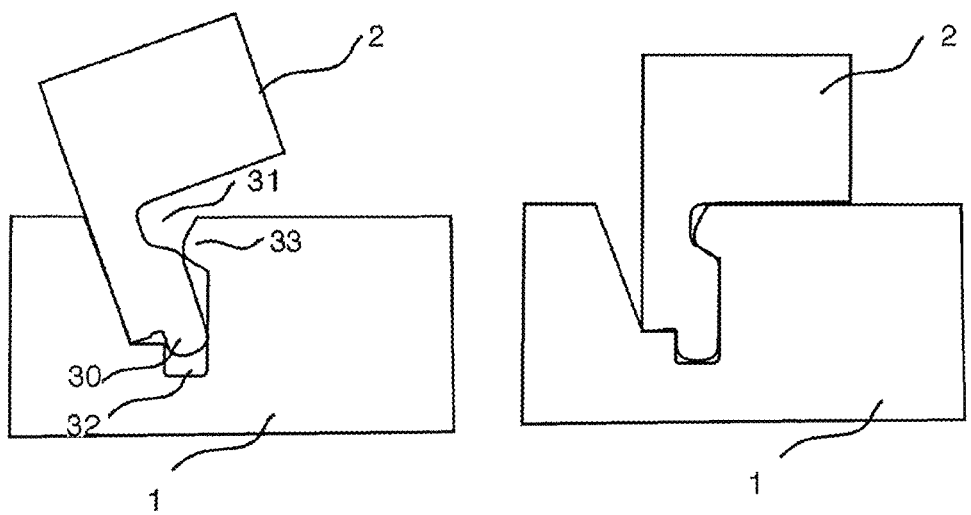

FIGS. 8a and 8b shows that two panels may be angled together according to the generally known principles used in locking systems for flooring. Such angling connection may be combined with all snapping embodiments described above. FIG. 8a shows an angling connection of a corner section and FIG. 8b shows an angling connection of a middle section. The second panel 2 that is angled during connection comprises a tongue 30 and a locking groove 31 that cooperates during locking with a tongue groove 32 and a locking element 33 formed in the first panel.

Figure 9A:
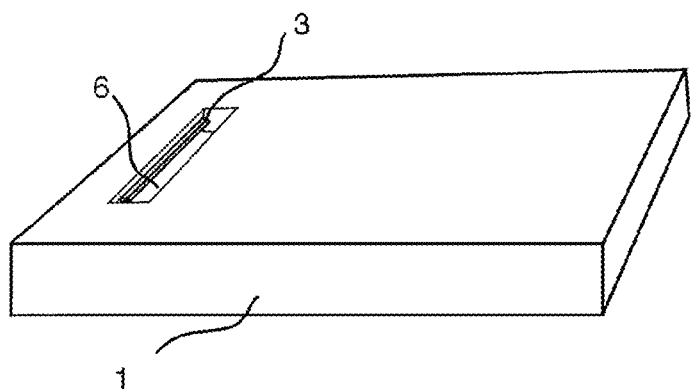
FIGS. 9a-9d illustrate a partial groove and a side push tongue according to embodiments of the invention.

All fixation and tongue grooves may be formed over the complete length or with of a panel. They may also be formed as one or several local grooves, which only extend along a part of the panel. Such grooves may be formed in many ways for example with rotating jumping tool heads. Such a local groove 6 is schematically shown in FIG. 9a.

Figure 9B:
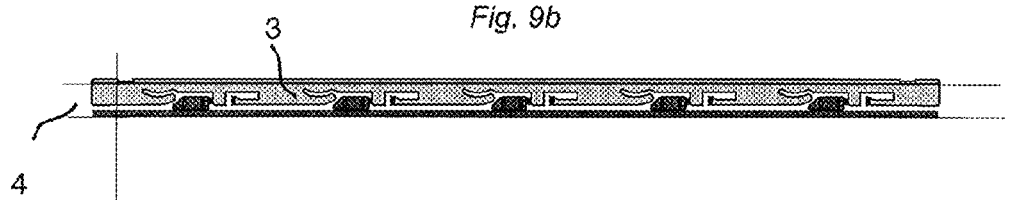
Figure 9C:
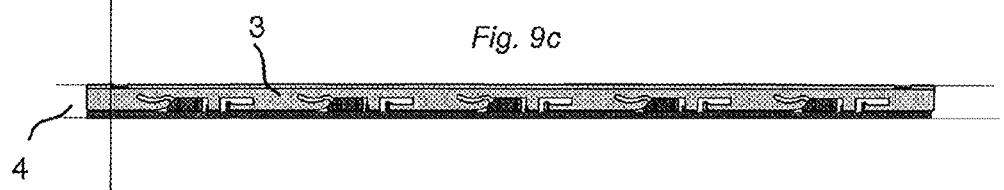
Figure 9D:
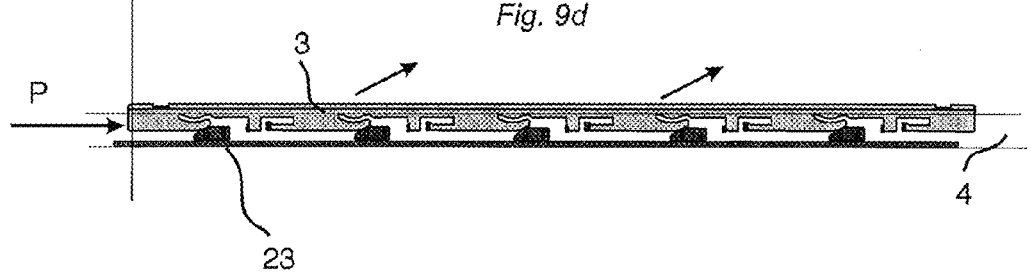

FIGS. 9b-9d show that the so-called side push locking systems may also be used to connect furniture components. Such a tongue 3 that is displaced width a side pressure P along the insertion groove 4 and perpendicularly to the insertion groove into the tongue groove may be used in all embodiments shown above. The perpendicular displacement may be accomplished with wedges 23 or with a fixation groove, which have a depth that varies along the groove. The tongue 3 and the tongue groove may also comprise overlapping protrusion and a locking may be accomplished with a displacement along the insertion groove without any perpendicular displacement into the tongue groove. Such embodiments allow locking with a rigid tongue and no flexible parts are needed.

Figure 10A:
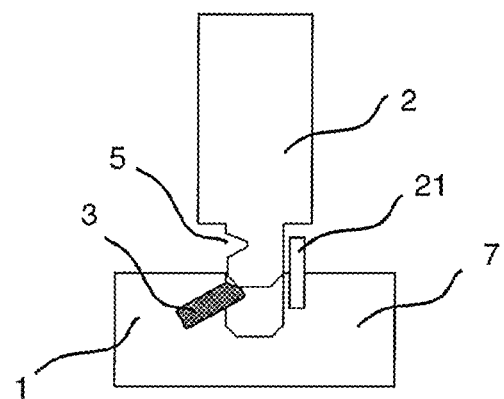
FIGS. 10a-10c illustrate embodiments of the invention.
Figure 10B:
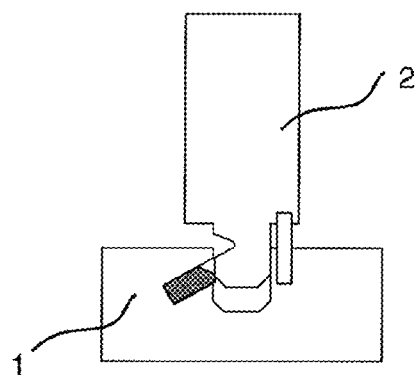
Figure 10C:
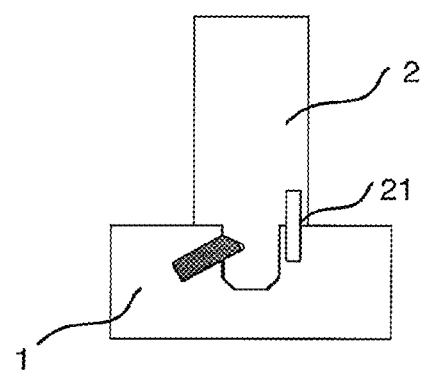

FIGS. 10a-10c show an embodiment of the invention further comprising a plug 21 of, e.g., plastic, wood or metal at of the panels 1, 2 inserted into a hole, preferably at the edge of the other panel. The plug and the hole increases the strength of the connection and may be used to position the panels.

Figure 11A:
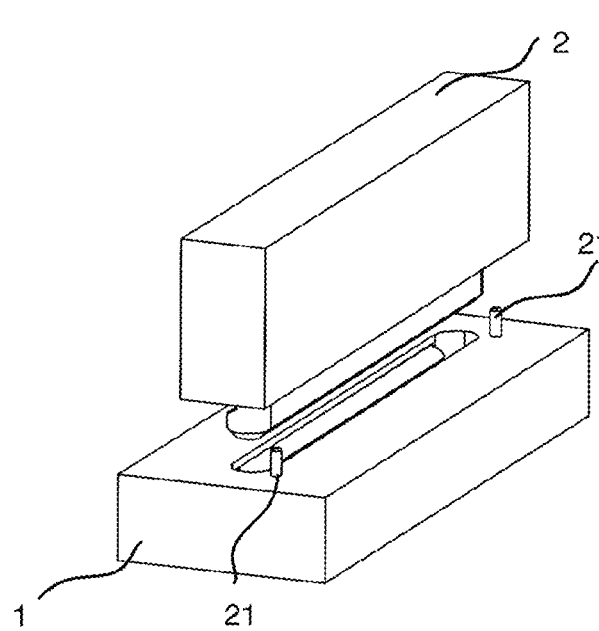
FIGS. 11a-11d illustrate embodiments of the invention in a 3d view.
Figure 11B:
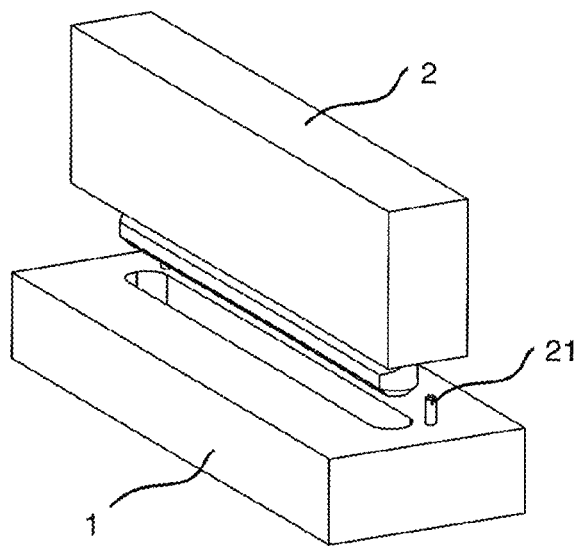
Figure 11C:
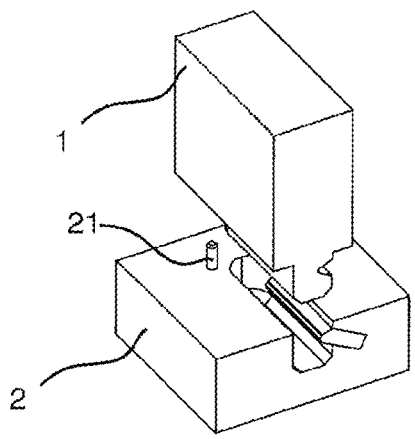
Figure 11D:
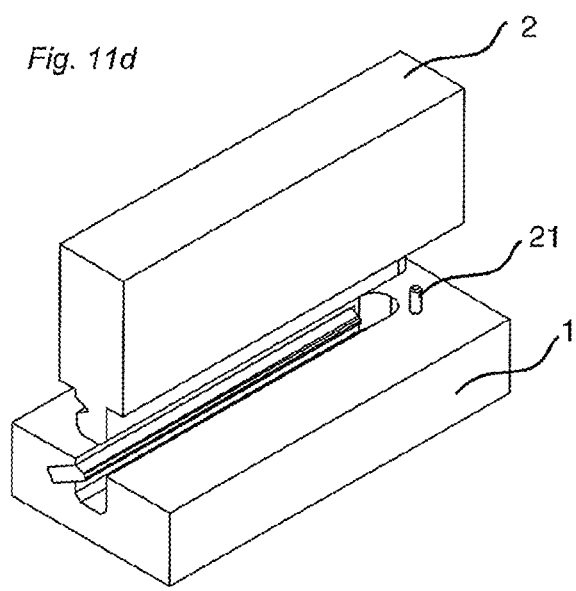

FIGS. 11a-11b show the embodiment in FIGS. 10a-10c in a 3d view at two different angles and FIGS. 11c-11d a cross section in a 3d view at two different angles.

Embodiments

1. A set of panels (1,2) comprising a first (1) and a second panel (2), an edge (16) of the second panel is insertable into a groove (6) of the first panel (1), when the panels are arranged essential perpendicular to each other, to obtain a mechanical connection between the first and the second panel, when the second panel is displaced essentially perpendicularly to the first panel, wherein:

said edge (16) comprises a separate and flexible tongue (3) and said groove (6) comprises a tongue groove (5), or said edge (16) comprises a tongue groove (5) and said groove (6) comprises a separate and flexible tongue (3);

the separate and flexible tongue (3) is insertable into the tongue groove (5) for connecting said panels to each other in a first direction, which is parallel to a main plane (MP) of the first panel;

the edge (16) of the second panel is configured to cooperate with the groove (6) of the first panel for connecting said panels to each other in a second direction, which is parallel to a main plane (MP) of the second panel;

the length direction of the separate and flexible tongue (3) extends parallel with said edge and/or groove;

the groove (6) comprises an opening, two side walls (6*b*, 6*c*) and a bottom (6*a*);

the separate and flexible tongue (3) is arranged in an insertion groove (4);

the separate and flexible tongue has an inner part (9) mounted in the insertion groove (4) and an outer part (10) extending outside an opening of the insertion groove; and the flexible tongue is displaceable inwardly towards a bottom of the insertion groove (4) and outwardly into the tongue groove (5) during locking.

2. The set of panels as recited in embodiment 1, wherein the flexible tongue has two opposite displacement surfaces (3*a*, 3*b*) located between the inner and the outer parts, each of the two opposite displacement surfaces of the flexible tongue (3) are displaceable against an upper and a lower wall respectively of the insertion groove during locking, inwardly towards the bottom of the insertion groove (4) and outwardly into the tongue groove (5).

3. The set of panels as recited in embodiment 1 or 2, wherein the said insertion groove (4) is inclined upwards with the opening closer to the main plane (MP) of the panel than the inner part insertion groove (4).

4. The set of panels as recited in any of the preceding embodiments, wherein the insertion groove (4) is inclined such that an extension E of its lower part is located at or above the upper part of the opening of the groove (6).

5. The set of panels as recited in any of the preceding embodiments, wherein the second panel comprises an outer edge with a smaller thickness than the panel body (2) such that the panel body overlaps one or both parts of the groove (6) opening (27, 28) when the second panel (2) is inserted into the groove (6) of the first panel (1).

6. The set of panels as recited in any of the preceding embodiments, wherein the inner part of the tongue (9) comprises one or several flexible protrusions (8) extending in the length direction of the tongue (3).

7. The set of panels as recited in any of the preceding embodiments, wherein the insertion groove (4) is formed in the groove (6) of the first panel (1).

8. The set of panels as recited in any of the preceding embodiments, wherein the insertion groove (4) is inclined in relation to the main plane of the second panel with an angle of about 10-45 degrees.

9. The set of panels as recited in any of the preceding embodiments, wherein the panels comprises at least two flexible tongues separated from each other.

10. The set of panels as recited in any of the preceding embodiments, wherein the groove (6) is formed as a partial groove extending along a part of a panel.

11. The set of panels as recited in any of the preceding embodiments, wherein the panels are provided with a locking element (12) and a locking groove (14) for locking the panels parallel to the main plane (MP) of the first panel (1).

12. The set of panels as recited in any of the preceding embodiments, wherein adjacent outer panel edges (17,18) in a corner portion are inclined inwardly against the main plane (MP) of the panels.

13. The set of panels as recited in any of the preceding embodiments, wherein the tongue (3) is locked with pre tension against the tongue groove (5).

14. The set of panels as recited in any of the preceding embodiments, wherein the resilient parts are formed of an injection moulded plastic material.

15. The set of panels as recited in any of the preceding embodiments, wherein the first and/or the second panel comprise separate materials (24, 25) that form an edge or a groove portion.

16. The set of panels as recited in embodiment 15, wherein the separate material is covered with a foil.

The invention claimed is:

1. A set of furniture components provided with a mechanical locking system for locking a first panel and a second panel essentially perpendicularly to each other,
the mechanical locking system comprising:
a groove provided in the first panel,
an edge of the second panel,
an insertion groove provided in the groove of the first panel or in the edge of the second panel,
a tongue groove provided in the edge of the second panel or in the groove of the first panel, and
a separate and flexible tongue provided in the insertion groove,
wherein the edge of the second panel is configured to be inserted into the groove of the first panel for locking said first and second panels to each other in a direction perpendicular to the main plane of the second panel,
wherein the separate and flexible tongue is configured to cooperate with the tongue groove for locking said first and second panels to each other in a direction perpendicular to the main plane of the first panel,
wherein the insertion groove, the tongue groove, and the separate and flexible tongue are arranged and configured such that displacing the second panel essentially perpendicularly to the first panel causes the flexible tongue to be linearly displaced inwardly towards a bottom of the insertion groove and outwardly into the tongue groove during locking, and
wherein said groove is formed as a partial groove extending along only a partial length of the first panel.

2. The set of furniture components according to claim 1, wherein the groove has a main longitudinal axis in a longitudinal direction that is transverse to opposite first and second side edges of the first panel, and the groove is spaced from the first side edge of the first panel.

3. The set of furniture components according to claim 2, wherein the groove is spaced from the second side edge of the first panel.

4. The set of furniture components according to claim 1, wherein the edge of the second panel is configured to be inserted into the groove of the first panel when main planes of the first panel and the second panel are arranged essentially perpendicularly to each other.

5. The set of furniture components according to claim 1, wherein the insertion groove is formed in a side wall of the groove of the first panel.

6. The set of furniture components according to claim 1, wherein the second panel comprises an outer edge having a smaller thickness than a panel body of the second panel.

7. The set of furniture components according to claim 6, wherein the panel body overlaps one or both parts of a groove opening when the edge of the second panel is inserted into the groove of the first panel.

8. The set of furniture components according to claim 1, wherein an inner part of the separate and flexible tongue comprises one or several flexible protrusions extending in a length direction of the separate and flexible tongue.

9. The set of furniture components according to claim 1, wherein the first and second panels comprise at least two separate and flexible tongues which are spaced from each other.

10. The set of furniture components according to claim 1, wherein an inner part of the separate and flexible tongue is provided in the insertion groove and wherein an outer part of the separate and flexible tongue extends outside of the insertion groove in a locked state of the first and second panels.

11. The set of furniture components according to claim 1, wherein the separate and flexible tongue is configured to be displaced inwardly towards a bottom of the insertion groove and outwardly into the tongue groove during locking of the first and second panels.

12. The set of furniture components according to claim 11, wherein the separate and flexible tongue is configured to be linearly displaced during locking of the first and second panels.

13. The set of panels as claimed in claim 1, wherein adjacent outer panel edges of the first and second panels in a corner portion of the set of panels are inclined inwardly relative to the main planes of the first and second panels in a locked position of the first and second panels.

14. The set of furniture components according to claim 1, wherein the separate and flexible tongue has two opposite displacement surfaces configured to be displaced against an upper wall and a lower wall of the insertion groove during locking.

15. The set of furniture components according to claim 1, wherein the separate and flexible tongue is configured to be locked with pretension against the tongue groove.

16. The set of furniture components according to claim 1, wherein an edge or a groove portion of the first panel and/or the second panel comprises a separate material that is separate from a material of the first panel and/or the second panel.

17. The set of furniture components according to claim 1, wherein the mechanical locking system further comprises a plug and a hole configured to cooperate with each other during locking of the first and second panels.

18. A set of furniture components provided with a mechanical locking system for locking a first panel and a second panel essentially perpendicularly to each other, the mechanical locking system comprising:
a groove provided in the first panel,
an edge of the second panel,
an insertion groove provided in the groove of the first panel or in the edge of the second panel,
a tongue groove provided in the edge of the second panel or in the groove of the first panel, and
a separate and flexible tongue provided in the insertion groove,
wherein the edge of the second panel is configured to be inserted into the groove of the first panel for locking said first and second panels to each other in a direction perpendicular to the main plane of the second panel,
wherein the separate and flexible tongue is configured to cooperate with the tongue groove for locking said first and second panels to each other in a direction perpendicular to the main plane of the first panel,
wherein said groove is formed as a partial groove extending along only a partial length of the first panel, and
wherein the insertion groove is inclined upwards, a distance from an opening of the insertion groove to the main plane of the first panel being smaller than a distance from an inner part of the insertion groove to the main plane of the first panel, and said main plane of the first panel being provided along a side surface of the first panel in which the groove is provided.

19. A set of furniture components provided with a mechanical locking system for locking a first panel and a second panel essentially perpendicularly to each other, the mechanical locking system comprising:
a groove provided in the first panel,
an edge of the second panel,
an insertion groove provided in the groove of the first panel or in the edge of the second panel,
a tongue groove provided in the edge of the second panel or in the groove of the first panel, and
a separate and flexible tongue provided in the insertion groove,
wherein the edge of the second panel is configured to be inserted into the groove of the first panel for locking said first and second panels to each other in a direction perpendicular to the main plane of the second panel,
wherein the separate and flexible tongue is configured to cooperate with the tongue groove for locking said first and second panels to each other in a direction perpendicular to the main plane of the first panel,
wherein said groove is formed as a partial groove extending along only a partial length of the first panel, and
wherein the insertion groove is inclined such that a linear extension of a lower part of the insertion groove is located at or above the upper part of the opening of the groove.

\* \* \* \* \*